United States Patent
Okamura

(10) Patent No.: US 8,164,578 B2
(45) Date of Patent: Apr. 24, 2012

(54) LINEAR SHAPE PROCESSING DEVICE, LINEAR SHAPE PROCESSING METHOD, INFORMATION RECORDING MEDIUM, AND PROGRAM

(75) Inventor: Noriaki Okamura, Tokyo (JP)

(73) Assignee: Konami Digital Entertainment Co., Ltd, Tokyo (JP)

( * ) Notice: Subject to any disclaimer, the term of this patent is extended or adjusted under 35 U.S.C. 154(b) by 609 days.

(21) Appl. No.: 12/305,013

(22) PCT Filed: Jun. 20, 2007

(86) PCT No.: PCT/JP2007/062435
§ 371 (c)(1),
(2), (4) Date: Dec. 16, 2008

(87) PCT Pub. No.: WO2007/148730
PCT Pub. Date: Dec. 27, 2007

(65) Prior Publication Data
US 2009/0201262 A1    Aug. 13, 2009

(30) Foreign Application Priority Data

Jun. 22, 2006   (JP) .................................. 2006-172206

(51) Int. Cl.
*G06F 3/041* (2006.01)
(52) U.S. Cl. ........................................................ 345/173
(58) Field of Classification Search .................. None
See application file for complete search history.

(56) References Cited

U.S. PATENT DOCUMENTS

| | | | | |
|---|---|---|---|---|
| 6,289,112 | B1 * | 9/2001 | Jain et al. | 382/116 |
| 6,396,471 | B1 | 5/2002 | Hirakata | |
| 7,149,356 | B2 * | 12/2006 | Clark et al. | 382/209 |
| 7,627,178 | B2 * | 12/2009 | Suzuki et al. | 382/190 |

(Continued)

FOREIGN PATENT DOCUMENTS

EP    0764908 A    3/1997

(Continued)

OTHER PUBLICATIONS

Hochheiser et al., "Visual Queries for Finding Patterns in Time Series Data," 2002, XP002539699, [online], [retrieved in 2009]. <URL: http://hcil.cs.umd.edu/trs/2002-06/2002-06.pdf>.

(Continued)

*Primary Examiner* — K. Wong
(74) *Attorney, Agent, or Firm* — Howard & Howard Attorneys PLLC

(57) ABSTRACT

In a line shape processing device (201) for receiving an entry of a line shape via a mouse, a touch panel, etc. and processing the line shape, an entry receiving unit (202) receives an entry of information indicating whether a touch pen pushes the touch panel or not, and the pushed position if so. When pushing continuously occurs, a coordinate storage unit (203) stores, for each position included in a line segment joining a place pushed immediately before and a place pushed currently, the y-coordinate value of that position in association with the x-coordinate value of that position. A display unit (205) displays the line shape by acquiring, in an order regarding the x-coordinate values, the x-coordinate values and y-coordinate values stored in the coordinate storage unit (203), and plotting dots at positions within a screen designated by the x-coordinate values and the y-coordinate values.

10 Claims, 9 Drawing Sheets

U.S. PATENT DOCUMENTS 7,817,859 B2 * 10/2010 Lee ........................... 382/199
2004/0028274 A1    2/2004 Kawakami et al.

FOREIGN PATENT DOCUMENTS

| | | |
|---|---|---|
| JP | 58-094071 | 6/1983 |
| JP | 07-064696 | 3/1995 |
| JP | 09-319494 | 12/1997 |
| JP | 11-212714 | 8/1999 |
| JP | 2002-196878 | 7/2002 |
| JP | 2003-051014 | 2/2003 |
| JP | 2003-114760 | 4/2003 |
| JP | 2004-029918 | 1/2004 |

OTHER PUBLICATIONS

European Search Report EP07767273, dated Aug. 12, 2009, 5 pages.
Internation Search Report PCT/JP2007/062435 dated Aug. 28, 2007.

* cited by examiner (a)

(b) (c)

(a)

(b)

(c)

(d)

(e)

(f)

LINEAR SHAPE PROCESSING DEVICE, LINEAR SHAPE PROCESSING METHOD, INFORMATION RECORDING MEDIUM, AND PROGRAM

TECHNICAL FIELD

The present invention relates to a line shape processing device and line shape processing method suitable for receiving an entry of a line shape via a mouse, a touch panel, or the like, and processing the line shape, a computer-readable information recording medium storing a program for realizing these device and method on a computer, and the program.

BACKGROUND ART

There have conventionally been proposed techniques for receiving, via a touch panel, a mouse, or the like, an instruction entry that designates, by means of two coordinate values (typically, x-coordinate and y-coordinate values), the position of a point within a predetermined two-dimensional region, and processing the entered coordinate values. For example, the literature identified below discloses one such technique.

Patent Literature 1: Unexamined Japanese Patent Application KOKAI Publication No. 2003-114760

[Patent Literature 1] discloses a technique for moving a mouse pointer, which enables precise moves of the pointer by controlling it to move by a travel distance per unit operation amount that is shorter than a travel distance per a unit operation amount.

Meanwhile, techniques for drawing a curve of any kind on a screen by an entry of coordinate values via a touch panel or a mouse are also widely used.

Furthermore, it is also a widespread practice to plot temporal changes of a stock price or body weight by indicating time on the horizontal axis (x axis) and the value at each point of time on the vertical axis (y axis). The shape of the line that represents the graph is formed by each point to make the line being designated by a first coordinate value and a second coordinate value (in the present example, an x-coordinate value and a y-coordinate value, respectively), with a unique second coordinate value y determined for each first coordinate value x as in a form of an explicit function such as $y=f(x)$.

DISCLOSURE OF INVENTION

Problem to be Solved by the Invention

Hence, there is a strong demand for a technique for receiving and variously processing shape of lines having such a restrictive condition, which technique enables users to easily make entries or corrections in the ongoing process.

The present invention aims for solving the above-described problem, and an object of the present invention is to provide a line shape processing device and line shape processing method suitable for receiving an entry of a line shape via a mouse, a touch panel, or the like, and processing the line shape, a computer-readable information recording medium storing a program for realizing these on a computer, and the program.

Means for Solving the Problem

To achieve the above object, the following invention is disclosed according to the principle of the present invention.

A line shape processing device according to a first aspect of the present invention processes shape of lines laid in a two-dimensional region with each position taken by the lines in the two-dimensional region designated by a first coordinate value and a second coordinate value, and includes an entry receiving unit, a storage unit, and a display unit, which are configured as follows.

First, an instruction entry of a first kind, which designates a position of a point included in a line to be laid in the two-dimensional region, and an instruction entry of a second kind, which is different from an instruction entry of the first kind are received.

When processing coordinate values of a line diagram such as a graph that takes a temporal axis in the horizontal direction, it is typical to use an orthogonal coordinate system as its coordinate system, and use x-coordinate values as first coordinate values and y-coordinate values as second coordinate values. However, in some applications, x-coordinate and y-coordinate may be interchanged, or an oblique coordinate system or a polar coordinate system may be used. For example, in drawing a pie chart, the first coordinate value may represent angle and the second coordinate value may represent radius.

In a case where such an input device is used that moves the mouse pointer within the screen along with a move of the mouse, it is typical that instruction entries of the first kind that designate the positions of the mouse pointer within the screen are sequentially entered only for a period of a drag operation in which the mouse is moved while its button is pushed.

In this case, while any other operation than this is made, such as freeing up the button of the mouse or moving the mouse with its button freed up, instruction entries of the second kind are sequentially entered.

On the other hand, in a case where such an input device as a touch panel is used, it is typical that instruction entries of the first kind, which designate the positions of the points included in the locus formed while the touch pen is moved with it keeping contact with the touch panel (with the touch panel kept pushed), are sequentially entered.

In this case, any other operation than this, such as detaching the touch pen from the touch panel, etc. is associated with an instruction entry of the second kind.

Meanwhile, in a case where instruction entries of the first kind are continuously received, the storage unit stores, for each first coordinate value included in a range from the first coordinate value of a start position designated by an older one of the instruction entries of the first kind to the first coordinate value of an end position designated by a later one of the instruction entries of the first kind, a second coordinate value of a point having the first coordinate value concerned and included in a line segment joining the start position and the end position, such that the second coordinate value is stored in association with the first coordinate value concerned.

The storage unit is typically prepared in a random access memory (RAM). Each pair of a first coordinate value and a second coordinate value may be stored as they are. Alternatively, in a case where first coordinate values are represented by integers, second coordinate values may be stored in an array indexed by the first coordinate values so that only a second coordinate value that is entered last for each first coordinate value may be stored.

In a case where the older instruction entry of the first kind designates coordinates $(x_1, y_1)$, and the later instruction entry of the first kind designates coordinates $(x_2, y_2)$, $x_1$ and $x_2$ do not necessarily adjoin each other (the difference between $x_1$ and $x_2$ is not necessarily 1). Therefore, a line segment that joins $(x_1, y_1)$ and $(x_2, y_2)$ is assumed. The position $(x, y)$ of a point included in this line segment is expressed as follows.

$$(x, (x_2-x) \cdot y_1/(x_2-x_1) + (x-x_1) \cdot y_2/(x_2-x_1))$$

Note that x exists between $x_1$ and $x_2$.

In (x, y) given as above, x is varied at such an appropriate granularity as follows.

(a) in a case where $x_1 < x_2$, x is incremented by 1 from $x_1$ as the initial value of x up to $x_2$.

(b) in a case where $x_2 < x_1$, x is decremented by 1 from $x_1$ as the initial value of x down to $x_2$.

(c) in a case where $x_1 = x_2$, it is set to $(x, y) = (x_2, y_2)$.

For (x, y) obtained in this manner, the storage unit stores x and y in association. At this time, even when a certain second coordinate value has been stored for the same first coordinate value x as concerned now, the stored value is overwritten so that the latest second coordinate value y is always stored. That is, the storage unit stores a second coordinate value y, that is most lately entered for a first coordinate value x.

The display unit displays the shape of the line laid in the two-dimensional region, by acquiring, in a predetermined order regarding first coordinate values, the second coordinate values stored in association with the first coordinate values, and plotting dots at positions on a screen that are associated with such positions within the two-dimensional region as designated by the first coordinate values associated with the acquired second coordinate values and the second coordinate values.

In a case where x-coordinate values and y-coordinate values are used as first coordinate values and second coordinate values respectively, the x-coordinate values may be obtained in an ascending order to obtain y-coordinate values for the respective x-coordinate values, or the x-coordinate values may be obtained in a descending order to obtain y-coordinate values for the respective x-coordinate values.

When dots are plotted at (x, y) obtained in this manner, the shape of the line is drawn by a dotted line (broken line), forming a graph that can be displayed as an explicit function such as y=f(x).

According to the present invention, even when a user enters coordinate values of points forming a line diagram that makes a graph shape of an explicit function, with the graph shape resulting in being entered out of place, the line shape processing device can easily obtain the coordinate values of points of a graph having a shape assumed to be closer to the shape desired by the user.

Further, in the line shape processing device according to the present invention, the storage unit may be configured such that in a case where an instruction entry of the first kind is received continuously after an instruction entry of the second kind is received, it stores the second coordinate value of the point designated by the instruction entry of the first kind in association with the first coordinate value of the point.

The present invention is characterized by a process at the beginning of a correction for correcting the shape of a line drawn before. When explained in an example of a touch panel and a touch pen, this process represents an operation of once pushing the touch panel and drawing a graph by moving across the touch panel, then detaching the touch pen from the touch panel, and pushing the touch panel at another position with the touch pen.

In such a case, for a first coordinate value of the position at which the touch pen is newly placed, not the second coordinate value entered before but the second coordinate value of the new position is stored in association.

Meanwhile, in the process of displaying the line shape, the display unit shifts sequentially through the first coordinate values to draw the line shape by joining the points designated by the first coordinate values and the second coordinate values. Therefore, whatever position the touch pen is placed, the line will be one continuous shape.

According to the present invention, in a case where a line shape needs to be changed, a position that would overlap the line shape entered before needs not be designated in order to obtain one continuous line shape. Therefore, the user can easily edit and correct the line shape with a simple process.

In the line shape processing device according to the present invention, the entry receiving unit may receive a pushing operation into a surface of the screen as an instruction entry of the first kind that designates such a position within the two-dimensional region as associated with a position that receives the pushing operation, and receive a detaching operation away from the surface of the screen as an instruction entry of the second kind.

According to the present invention, the touch panel is set on the surface of a screen, and the positions on the screen at which dots or a line diagram are/is to be displayed coincide with the positions to push by the touch pen when plotting dots or drawing a line diagram with it. That is, the present invention utilizes a touch screen formed by a screen and a touch panel integrated together.

The present invention is in accordance with a preferred embodiment of the invention described above. According to the present invention, the user can easily designate the positions of points included in a line having a desired shape.

The line shape processing device according to the present invention includes a deleting unit, which may be configured as follows.

Namely, in a case where instruction entries of the first kind are received continuously a predetermined number of times, and in a case where, for every pair of instruction entries of the first kind that adjoin each other among the instruction entries of the first kind received continuously, a vector that runs from a position designated by an older one of the instruction entries of the first kind in the pair concerned to a position designated by a later one of the instruction entries of the first kind in the pair concerned makes an angle equal to or larger than a predetermined obtuse angle with a vector that runs in a direction in which only first coordinate values shift in the predetermined order in the two-dimensional region, the deleting unit deletes from the storage unit, second coordinate values stored in the storage unit in association with first coordinate values that are included in a range defined by a smallest value and a largest value among first coordinate values respectively designated by the instruction entries of the first kind received continuously.

In a case of monitoring the state of the touch pen at regular time intervals and receiving instruction entries from this state, having "instruction entries of the first kind received continuously a predetermined number of times" corresponds to having "the touch pen run across the surface of the touch panel for equal to or longer than a certain period of time.

In a case where x-coordinate values are used as first coordinate values and dots are plotted for x in an ascending order, "the direction in which only first coordinate values shift in the predetermined order in the two-dimensional region" indicates the positive direction of the x-axis.

In a case where the coordinates designated by the instruction entries of the first kind received continuously M times are as follows in the order of time elapse:

$$(x_1, y_1), \ldots, (x_M, y_M),$$

and in a case where a direction vector for every i=1, 2, ..., M−1, namely, $$(x_{i+1} - x_i, y_{i+1} - y_i)$$

makes an obtuse angle θ or larger with the positive direction of the x-axis, that is, in a case where the followings are both true, $$x_{i+1} < x_i, |(y_{i+1}-y_i)/(x_{i+1}-x_i)| \leq \tan \theta,$$

deleting is performed.

For example, in a case where the x-axis is set in the horizontal direction of the screen and the positive direction of the x-axis runs from the left to the right, the user should try as much as possible to move the touch pen from the left to the right. At this time, even if the touch pen moves retrogressively from the right to the left due to a bit of an operational error, the line shape will be determined to match the record of the touch pen's movement.

However, when the touch pen is moved from the right to the left horizontally for a certain period of time or longer, a line portion that is included in the range from the x-coordinate of the position at which this movement starts to the x-coordinate of the position at which this movement ends is deleted.

As a method for deleting, an impossible value, e.g., a coordinate value that falls outside the two-dimensional region, may be stored when coordinate values are stored in the RAM, or each second coordinate value may be stored together with flag information that indicates whether or not the two-dimensional value is deleted or not.

According to the present invention, it becomes easy to erase a portion of a line shape of an entered graph or the like to draw a discontinuous line shape, or to edit a line shape by deleting an unnecessary segment.

In the line shape processing device according to the present invention, first coordinate values may be represented by integers, and the display unit may be configured such that in a case where a first coordinate value of a dot plotted and a first coordinate value of a dot plotted immediately before adjoin each other, it further draws a line segment that joins the dot plotted and the dot plotted immediately before.

The present invention is in accordance with a preferred embodiment of the invention described above. In the invention described above, a graph that corresponds to y=f(x) is displayed as a line of dots that have the x-coordinate values and the y-coordinate values of the graph. According to the present embodiment, in a case where the x-coordinates of two points to be plotted are sufficiently close, for example, in a case where the two points adjoin each other with a gap of the display granularity (dot unit) of the screen, it is possible to draw the graph as a line diagram by drawing a line segment between the two point.

In a case where x-coordinates do not adjoin each other, no line segment will be drawn between them. Therefore, it is possible to draw a discontinuous graph that has no y-coordinates defined for a certain segment of a series of x-coordinates for y=f(x).

According to the present invention, it becomes easy to display a graph or the like of various kinds, by drawing a line shape of the graph or the like that appropriately joins the positions of entered points.

In the line shape processing device according to the present invention, the storage unit may store, as element of an array indexed by each first coordinate value, a second coordinate value or a value that indicates that a second coordinate value to be associated with the first coordinate value has been deleted, and the display unit may acquire a second coordinate value associated with each first coordinate value by scanning elements of the array in a manner that indices of the array shift in the predetermined order.

In many information processing devices, first coordinate values and second coordinate values are both entered as integers. In a case where a size of width 320×height 240 is used as the predetermined region, the second coordinate values can take 240 values from 0 to 239, which can be expressed by 1 byte, and the first coordinate values can take 320 values from 0 to 319. Therefore, 320 bytes is adequate as the whole size of the array. It is possible to make it such that in a case where 255 is stored as the value of an element of the array (that is, as a second coordinate value), the graph is not drawn at the first coordinate value that indexes that element (or the dot is deleted at this first coordinate).

According to the present invention, it is possible to perform processes at a high speed by realizing a data structure in which it is easy to manage the second coordinate value that is stored last for each first coordinate value as the only value for the first coordinate value.

In the line shape processing device according to the present invention, a coordinate axis in a horizontal direction and a coordinate axis in a vertical direction may be set in the two-dimensional region, and first coordinate values may be coordinate values on the coordinate axis in the horizontal direction, and second coordinate values may be coordinate values on the coordinate axis in the vertical direction.

The present invention is in accordance with the most typical embodiment of the invention described above. As illustrated above, according to the present invention, a temporal axis is set in the horizontal direction (horizontal axis). When the user wants to enter a graph of stock price movements in which the temporal axis is set in the horizontal direction (horizontal axis) and stock prices are set in the vertical direction (vertical axis), the user can easily enter or correct the shape, etc. of the stock price movements.

In the line shape processing device according to the present invention, the direction in which only first coordinate values shift in the predetermined order may head from the left to the right in the horizontal direction.

The present invention is in accordance with the most typical embodiment of the invention described above. According to the present invention, it is possible to enter a graph of stock price movements, etc. by pushing the touch pen to move from roughly the left to the right, whereas it is possible to delete a portion of the shape of the graph of stock price movements, etc. by pushing the touch pen to move across that portion generally horizontally from the right to the left. Hence, according to the present invention, the user can easily delete a portion of the graph of stock price movements, etc., when he/she needs it.

In the line shape processing device according to the present invention, a coordinate system of polar coordinate points may be set in the two-dimensional region, and first coordinate values may be coordinate values representing an angle of the polar coordinate points while second coordinate values may be coordinate values representing a radius of the polar coordinate points.

The present invention is in accordance with a preferred embodiment of the invention described above. In some cases, a star-shaped graph may be used to display a plurality of parameters. A star-shaped graph displays a plurality of parameters by a regular polygon, the vertices of which are associated with the respective kinds of parameters. The regular polygon is formed by joining together the distal ends of line segments that radiate from the center of the polygon to the vertices thereof for lengths equal to the value of the parameters associated with the respective vertices. This is equivalent to displaying a graph on a coordinate system of polar coordinate points.

According to the present invention, the user can enter and edit such a star-shaped graph easily with a simple operation when he/she needs to do it.

A line shape processing method according to another aspect of the present invention processes shape of lines laid in a two-dimensional region with each position taken by the lines in the two-dimensional region designated by a first coordinate value and a second coordinate value. The method is performed by a line shape processing device including an entry receiving unit, a storage unit, and a display unit. The method includes an entry receiving step a storing step, and a displaying step, which are configured as follows.

First, at the entry receiving step, the entry receiving unit receives an instruction entry of a first kind, which designates a position of a point included in a line to be laid in the two-dimensional region, and an instruction entry of a second kind, which is different from an instruction entry of the first kind.

At the storing step, in a case where instruction entries of the first kind are continuously received, the storage unit stores, for each first coordinate value included in a range from a first coordinate value of a start position designated by an older one of the instruction entries of the first kind to a first coordinate value of an end position designated by a later one of the instruction entries of the first kind, a second coordinate value of a point having the first coordinate value concerned and included in a line segment joining the start position and the end position, such that the second coordinate value is stored in association with the first coordinate value concerned.

At the displaying step, the display unit displays the shape of the line laid in the two-dimensional region, by acquiring, in a predetermined order regarding first coordinate values, the second coordinate values stored in the storage unit in association with the first coordinate values, and plotting dots at positions on a screen that are associated with such positions within the two-dimensional region as designated by the first coordinate values associated with the acquired second coordinate values and the second coordinate values.

A program according to another aspect of the present invention controls a computer to function as the line shape processing device described above, and controls a computer to perform the line shape processing method described above.

The program according to the present invention may be recorded on a computer-readable information recording medium such as a compact disk, a flexible disk, a hard disk, a magneto-optical disk, a digital video disk, a magnetic tape, a semiconductor memory, etc.

The program described above may be distributed and sold via a computer communication network separately from a computer on which the program is executed. The information recording medium described above may be distributed and sold separately from a computer.

Effects of the Invention

According to the present invention, it is possible to provide a line shape processing device and line shape processing method suitable for receiving an entry of a line shape via a mouse, a touch panel, or the like and processing the line shape, a computer readable information recording medium storing a program for realizing these device and method on a computer, and the program.

Figure 1:
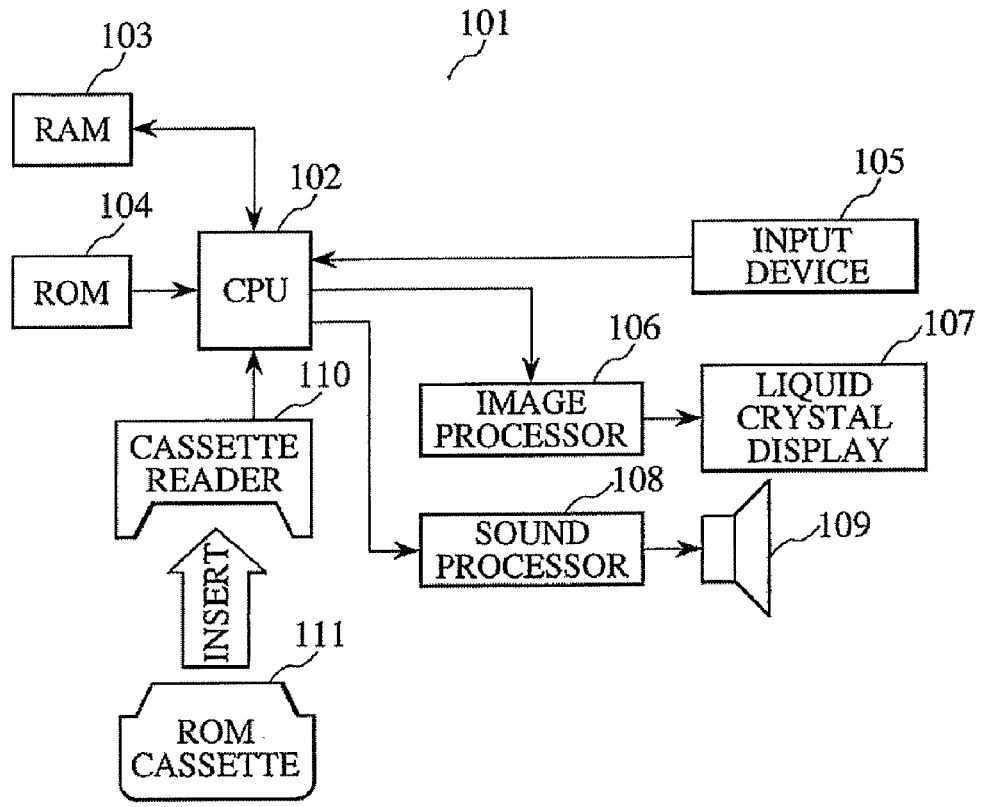
FIG. 1 is an explanatory diagram showing a schematic configuration of a general information processing device by which a line shape processing device according to the present invention is embodied.

EXPLANATION OF REFERENCE NUMERALS 101 information processing device
102 CPU
103 RAM
104 ROM
105 input device
106 image processor
107 liquid crystal display
108 sound processor
109 speaker
110 cassette reader
111 ROM cassette
201 line shape processing device
202 entry receiving unit
203 coordinate storage unit
204 log storage unit
205 display unit
206 deleting unit
207 detecting unit
401 zigzag line
402 folded portion
403 graph line
404 straight line
405 graph line
601 erasing line
603 graph line
901 local maximum point
906 local minimum point
911 local maximum point
916 local minimum point
921 local maximum point
926 local minimum point
931 local maximum point
936 local minimum point
961 median point between older local maximum points
966 median point between older local minimum points 971 median point between latest local maximum points
976 median point between latest local minimum points
991 candidate storage unit
992 similarity extracting unit
993 presenting unit

BEST MODE FOR CARRYING OUT THE INVENTION

Embodiments of the present invention will be explained below. To facilitate understanding, embodiments in which the present invention is realized with the use of an information processing device for game purposes will be explained, but the embodiments to be explained below are for illustration purposes, not to limit the scope of the present invention. Hence, although those skilled in the art can employ embodiments obtained by replacing some or all of the elements of the embodiments to be explained below with equivalents of those, such embodiments will also be included in the scope of the present invention.

Embodiment 1

FIG. 1 is an explanatory diagram showing a schematic configuration of an ordinary information processing device by which a line shape processing device according to the present invention is realized. The following explanation will be made with reference to this diagram.

The information processing device 101 includes a central processing unit (CPU) 102, a random access memory (RAM) 103, a read only memory (ROM) 104, an input device 105, an image processor 106, a liquid crystal display 107, a sound processor 108, a speaker 109, and a cassette reader 110.

The CPU 102 controls each component of the information processing device 101. The memory area of the RAM 103, the memory area of the ROM 104, and the memory area of a ROM cassette 111 inserted into the cassette reader 110 are all mapped to one memory space that is managed by the CPU 102. By reading the address to which each memory area is mapped, the CPU 102 can get the information stored in that memory area. The memory area of the RAM 103 is also write-enabled.

In addition, the registers, which are the window to the image processor 106 or to the sound processor 108 when the CPU 102 issues any command to it, or the window to the input device 105 when the CPU 102 acquires some information therefrom, are also mapped to this memory space. Hence, the CPU 102 can issue a command by writing data representing the command into a predetermined address or can acquire information by reading data from a predetermined address.

When the information processing device 101 is turned on, the CPU 102 activates a program that starts from an address, to which the memory area of the ROM cassette 111 inserted into the cassette reader 110 is mapped. The RAM 103 is used for various purposes as a short memory area. A basic input/output system (BIOS) routine is recorded on the ROM 104, so that necessary programs can be called from the ROM cassette 111.

The input device 105 reflects an entry from any button for receiving an instruction entry designating a direction or an entry from any button for receiving an instruction entry distinctively indicating an operation of whatever kind, to the registers mapped to the memory space, and determines whether a touch panel attached to the surface of the top face of the liquid crystal display 107 is pushed or not and receives an entry of the coordinates of any point that is determined to be pushed.

The liquid crystal display 107 is managed by the image processor 106, which uses a memory area for storing tiles mapped to the memory space and a memory area for storing an object attribute memory. When the CPU 102 writes a value generated by computation into these memory areas or appropriately transfers information from the ROM cassette 111 inserted into the cassette reader 110 to these memory areas, sprite images are displayed on the liquid crystal display 107.

In addition, a frame buffer that manages, in the pixel unit, the images to be displayed on the liquid crystal display 107 can also be used. When a given color should be displayed at a given position on the liquid crystal display 107, writing a value corresponding to that color into the frame buffer at a position corresponding to that position will cause a bitmap image to be displayed on the liquid crystal display 107 at an appropriate timing.

For example, in a case where the liquid crystal display 107 is of a 320×200 dot size for 16-bit color display, the color of one pixel is expressed by 2 bytes. Here, an array of 320×200 elements (each element taking 2 bytes) is secured in the RAM 103 as a frame buffer, and the elements in the array are associated with the pixels on the liquid crystal display 107 one to one. A 16-bit value representing any color is written into each element of the array, and the image processor 106 controls the contents of the frame buffer to be reflected onto the liquid crystal display 107 at an appropriate timing (e.g., at a cycle of vertical synchronization interrupt).

It is general to prepare one or plural unit(s) of liquid crystal display 107. When there are plural units, one liquid crystal display 107 may be for display purposes only, and the other liquid crystal display 107 may be affixed with a touch panel. In this case, an operation to push the touch panel with a touch pen causes the coordinate values of the corresponding position on the liquid crystal display 107 to be entered.

Although the present information processing device 101 is used for a typical portable game device, the technique of the present invention can also be applied to any application that runs on a general-purpose computer, to or from which data is input or output via a mouse and keyboard and a cathode ray tube (CRT). Such an embodiment is also included in the scope of the present invention.

(Basic Configuration)

Figure 2:
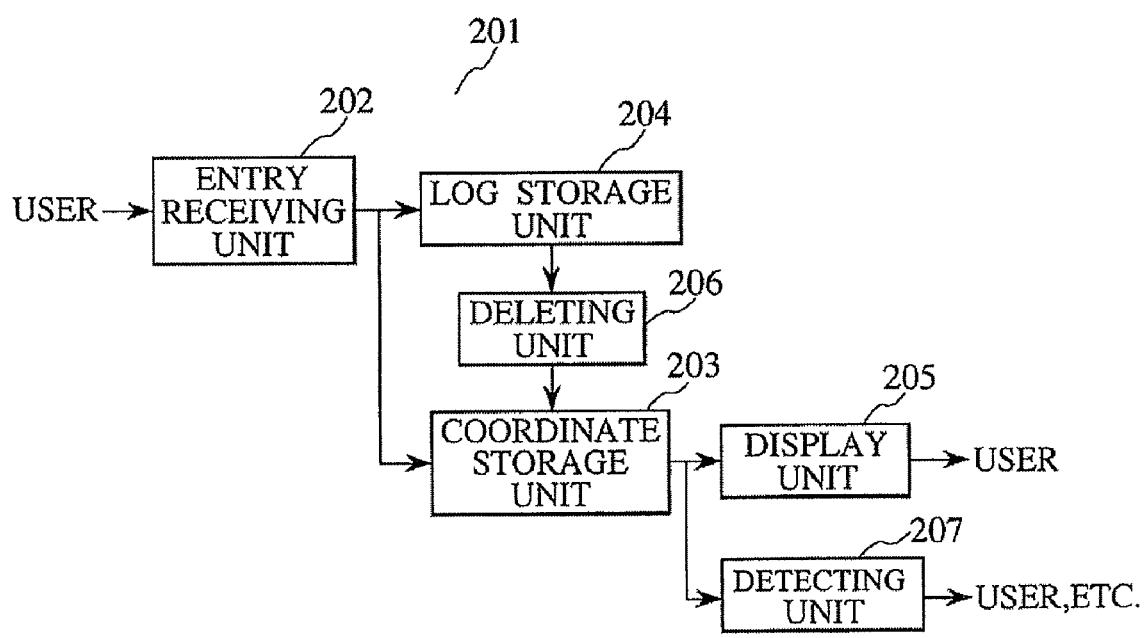
FIG. 2 is an explanatory diagram showing a schematic configuration of a line shape processing device according to the present embodiment.

FIG. 2 is an explanatory diagram showing a schematic configuration of a line shape processing device according to the present embodiment. The following explanation will be made with reference to this diagram.

The line shape processing device 201 according to the present embodiment includes an entry receiving unit 202, a coordinate storage unit 203, a log storage unit 204, a display unit 205, a deleting unit 206, and a detecting unit 207.

The entry receiving unit 202 is embodied by the combination of a touch panel affixed to the face of the liquid crystal display 107 and a touch pen. When the CPU 102 checks the value in a predetermined register mapped to the memory space, it can obtain information indicating whether the touch panel is pushed by the touch pen or freed from the touch pen. When the touch panel is pushed, the CPU 102 can further obtain the coordinates of the pushed position on the touch panel represented in the orthogonal coordinate system.

The present embodiment will consider a case where what is to be entered is a line of a graph that indicates temporal changes on the horizontal axis and values of a stock price or body weight on the vertical axis. The x coordinate corresponds to a first coordinate value, and the y coordinate corresponds to a second coordinate value. In the above-described example, possible x coordinate values are 0 to 319, and possible y coordinate values are 0 to 239. These values can be appropriately changed according to the field of application and the specifications of the information processing device 101.

The coordinate storage unit 203 stores the pair of the x-coordinate value and the y-coordinate value of each point included in the graph line. The log storage unit 204 logs entered coordinate values. The coordinate storage unit 203 and the log storage unit 204 are typically embodied by the RAM 103 under the control of the CPU 102.

The display unit 205 displays the graph line and is embodied by the liquid crystal display 107 under the control of the CPU 102. The deleting unit 206 appropriately manages the information stored in the coordinate storage unit 203 and the log storage unit 204, and is embodied by the CPU 102 in cooperation with the RAM 103.

The detecting unit 207 detects whether the line stored in the coordinate storage unit 203 has a predetermined characteristic shape or not, and is embodied by the CPU 102 in cooperation with the RAM 103.

The processes by the log storage unit 204 and the deleting unit 206 or the processes by the detecting unit 207 can be omitted in some application fields, and any embodiment that does not include such processes are also included in the scope of the present invention.

Figure 3:
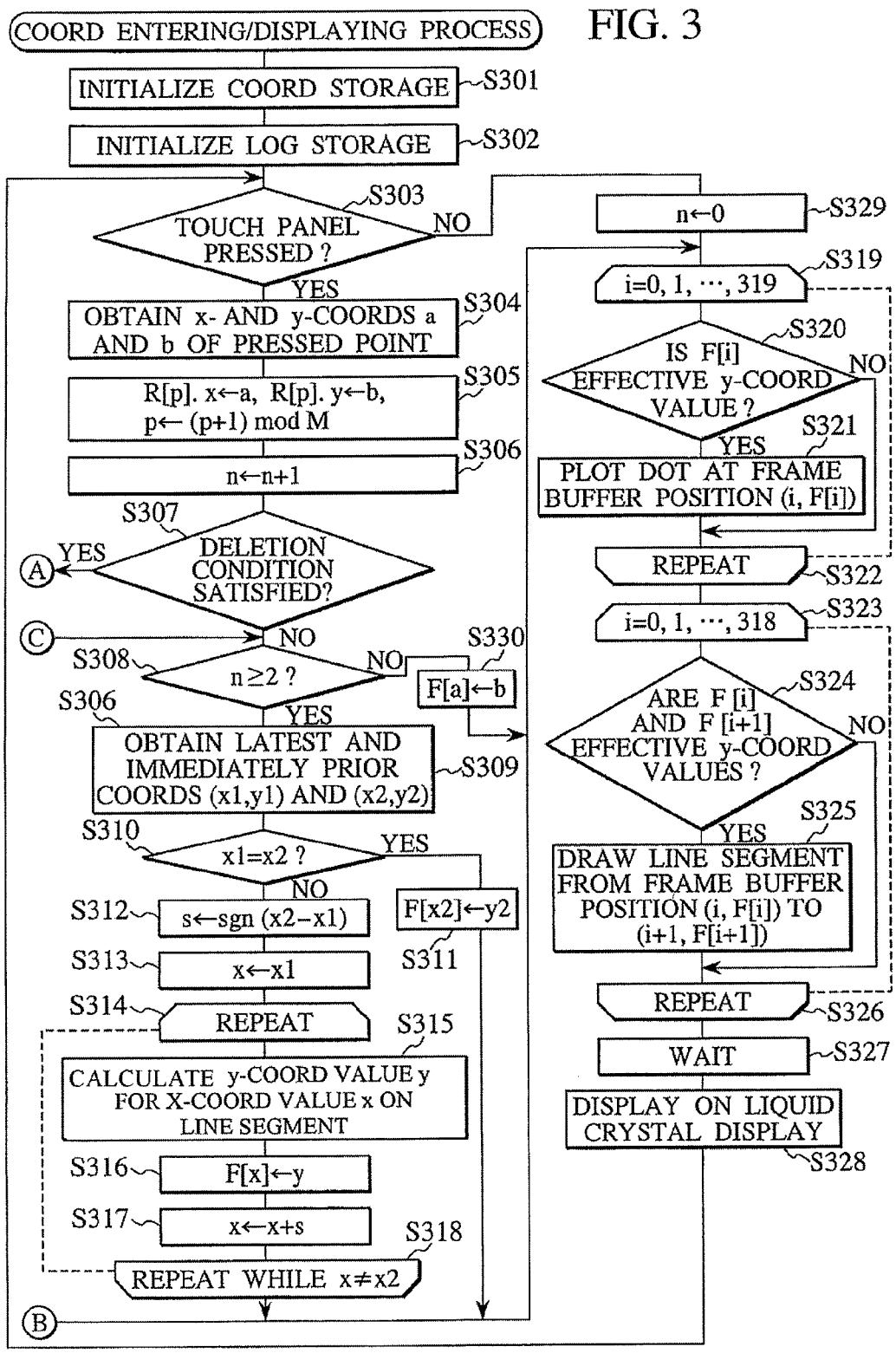
FIG. 3 is a flowchart showing the control flow of a coordinate value entering/gvb performed by the line shape processing device according to the present embodiment.

FIG. 3 is a flowchart showing the control flow of a coordinate value entering/displaying process performed by the line shape processing device of the present embodiment. The following explanation will be made with reference to this drawing.

First, the CPU 102 initializes the coordinate storage unit 203 secured in the RAM 103 (step S301), and initializes the log storage unit 204 secured therein (step S302).

The coordinate storage unit 203 is embodied by a 320-byte array F. The x-th order element of the array F will hereinafter be represented as F[x]. According to the present embodiment, the latest second coordinate value y for a first coordinate value x is stored in the x-th element F[x] in the array.

In the above-described example, the effective second coordinate values are 0 to 239. Therefore, a value 255 is used to indicate that "there is no second coordinate value y that corresponds to a given first coordinate value x, and the graph ends at the position of this first coordinate value x".

Accordingly, the coordinate storage unit 203 is initialized by performing F[x]←255 for x=0, 1, ..., 319. Here, "←" means to assign or substitute.

The log storage unit 204 is embodied as a ring buffer that sequentially stores a predetermined number M pairs of x-coordinate values and y-coordinate values that are entered the most lately.

The ring buffer is embodied by a variable p that stores the next position to register values, an array R whose elements are a structure organized by x-coordinates and y-coordinates, and a variable n that stores how many times pushing operations have been made continuously till the present time to enter coordinates (i.e., for how long pushing operations have been made continuously). The array R includes M number of elements. The i-th order element in the array R will hereinafter be represented as R[i], and the x-coordinate and y-coordinate of that element will be represented as R[i]·x and R[i]·y, respectively.

Accordingly, the log storage unit 204 is initialized by performing p←0 and n←0, and performing R[i]·x←−1 and R[i]·y←255 for i←0, 1, ..., M−1.

After the variable areas secured in the RAM 103 are each initialized in this way, the CPU 102 refers to a predetermined register mapped to the memory space to see whether the touch panel affixed to the face of the liquid crystal display 107 is pushed or not (step S303).

In a case where the touch panel is pushed (step S303; Yes), the CPU 102 refers to a predetermined register mapped to the memory space and obtains the x-coordinate value a and the y-coordinate value b of the position at which the touch panel affixed to the face of the liquid crystal display 107 is pushed (step S304). Through step S303 to step S304, the CPU 102 has received an instruction entry of a first kind.

Here, the CPU 102 may apply conversion process of various kinds to the x-coordinate value a and the y-coordinate value b, by inverting their sign and adding a fixed number to reverse their direction, or by multiplying or dividing them by an appropriate fixed number to change the granularity of the coordinate values to a desired one. When what is to be drawn is a shape of a pie chart, it is typical that the x-coordinate values indicate angle and the y-coordinate values indicate the distance from the center.

Then, the CPU 102 performs R[p].x←a, R[p]·y←b, and p←(p+1) mod M to register the obtained coordinate values in the ring buffer of the log storage unit 204 (step S305). Here, x mod y is equal to the remainder of dividing an integer x by a positive integer y (equal to a mathematical remainder, where $0 \leq (x \bmod y) \leq y-1$).

In a case where such an input device is used that moves the mouse pointer within the screen along with a move of the mouse, it is preferred that the positions of the mouse pointer within the screen be sequentially entered only for a period of a drag operation in which the mouse is moved while its button is pushed. This sequential entry can be made by performing the same processes as step S303 and step S304, but by using information showing whether the button of the mouse is pushed or not, and the current position of the mouse pointer.

Then, the CPU 102 performs n←n+1 (step S306), to count the number of times that shows that pushing operations (instruction entries of the first kind) have been continuously made till now. Since the processes from step S303 are performed at predetermined intervals as will be described later, the value of n can also be consider to indicate the length of time for which pushing operations have continued till now.

Then, the CPU 102 determines whether a predetermined deletion condition is satisfied or not (step S307). In a case where the deletion condition is satisfied, the CPU 102 appropriately deletes coordinate values that have been entered so far, which will be described in detail later. Alternatively, as described before, the flow may jump from step S306 to step S308 by skipping considering any deletion condition. Hence, explanation will be given here about a case the deletion condition is not satisfied (step S307; No).

In a case where the deletion condition is not satisfied (step S307; No), the CPU 102 determines whether or not pushing operations (instruction entries of the first kinds) have been continuously made, i.e., whether or not $n \geq 2$ is established (step S308).

In a case where the relationship is not established (step S308; No), i.e., in a case where an instruction entry of the first kind is made after an instruction entry of a second kind, in other words, in a case where the touch pen, which has been detached from the touch panel, is detected to be brought into contact with the touch panel, the CPU 102 performs F[a]←b (step S330) to register the information of the coordinates at which the touch panel is pushed, and advances to step S319. That is, step S330 corresponds to starting to correct the shape of the line having been entered before.

On the other hand, in a case where the above relationship is satisfied (step S308; Yes), the CPU 102 obtains the coordinates:

$$(x_1, y_2) = (R[(p-1) \bmod M] \cdot x, R[(p-1) \bmod M] \cdot y),$$

which are designated by the latest instruction entry of the first kind; and $$(x_2, y_2) = (R[(p-2) \bmod M] \cdot x, R[(p-2) \bmod M] \cdot y),$$

which are designated by the instruction entry of the first kind immediately before the latest one (step S309).

Then, the CPU 102 determines whether $x_1 = x_2$ is true or not (step S310), and if so (step S310; Yes), performs $F[x_2] \leftarrow y_2$ (step S311) to register the most lately entered second coordinate value $y_2$ for the first coordinate value $x_2$ in the coordinate storage unit 203 as a point that is traced by a line having a desired shape.

On the other hand, if $x_1 \neq x_2$ (step S310; No), the CPU 102 performs $s \leftarrow \text{sgn}(x_2 - x_1)$ for a variable area s secured in the RAM 103 (step S312). Here, sgn(z) is a function that returns 1 when z is positive and −1 when z is negative.

Then, the CPU 102 sets $x_1$ as an initial value in a variable area x secured in the RAM 103 (step S313), and repeats the following process (step S314). Namely, the CPU 102 performs, for a variable area y secured in the RAM 103, $$y \leftarrow (x_2 - X) \cdot y_1 / (x_2 - x_1) + (x - x_1) \cdot y_2 / (x_2 - x_1)$$

(step S315) to calculate the value of the second coordinate y when the first coordinate value of a point on a line segment that joins $(x_1, y_1)$ and $(x_2, y_2)$ is x.

The CPU 102 then performs $F[x] \leftarrow y$ (step S316) to register the second coordinate value y most lately entered for the first coordinate value x in the coordinate storage unit 203 as a point that is traced by the line having the desired shape.

The CPU 102 performs $x \leftarrow x + s$ (step S317) to repeat the process from step S314 to step S318 as long as $x \neq x_2$ is satisfied (step S318).

When the repetition is no more necessary, the CPU 102 starts to repeat the following process while incrementing by 1, the value i=0, 1, . . . , 319 (step S319).

First, the CPU 102 checks whether F[i] is an effective y-coordinate value or not (step S320). That is, in the present embodiment, the CPU 102 checks whether $0 \leq F[i] \leq 239$ is satisfied. In a case where F[i] is an effective y-coordinate value (step S320; Yes), the CPU 102 writes information instructing that a dot should be plotted, into the frame buffer that stores information corresponding to each pixel on the two-dimensional plane of the liquid crystal display 107, at a position of the frame buffer that corresponds to the coordinates (i, F[i]) (step S321). On the other hand, in a case where F[i] is not an effective value (step S320; No), the CPU 102 advances to step S322 without plotting any dot.

Among the points traced by the touch pen, the points whose position has been detected are displayed on the screen through the repetition of step S319 to step S322 (step S322).

The CPU 102 further repeats the following process while incrementing by 1, i=0, 1, . . . , 318 (step S323).

Specifically, the CPU 102 determines whether F[i] and F[i+1] are both effective y-coordinate values or not (step S324). The criterion of this determination is the same as that in step S319. In a case where both are effective y-coordinate values (step S324; Yes), the CPU 102 writes information instructing that a line segment from the coordinates (i, F[i]) to the coordinates (i+1, F[i+1]) should be drawn (step S325). The line segment drawing on the frame buffer may be processed by Bresenham's line drawing algorithm or by the image processor 107 if it has such a function.

On the other hand, in a case where not both are effective (step S324; No), the CPU 102 draws no line and advances to step S326.

Through the repetition of step S323 to step S326 (step S326), each line segment that joins the points whose position is a detected one of the positions traced by the touch pen is displayed on the screen.

The CPU 102 waits until a vertical synchronization interrupt occurs (step S327). In this waiting state, the CPU 102 can perform any other process co-routinely. When a vertical synchronization interrupt occurs, the CPU 102 instructs the image processor 106 to reflect the contents of the frame buffer onto the liquid crystal display 107 to display dots at the positions corresponding to the coordinates entered by the touch pen and to appropriately display the line segments that joins the dots (step S328). Then, the CPU 102 returns to step S303.

On the other hand, in a case where the touch pen is not pushed against the touch panel and away from it (step S303; No), the CPU 102 stores $n \leftarrow 0$ (step S329) and advances to step S319. This means that the CPU 102 has received an instruction entry of a second kind.

The following explanation will be about how the graph line is shaped through the above-described process when drawn by the locus of the touch pen's movement.

Figure 4:
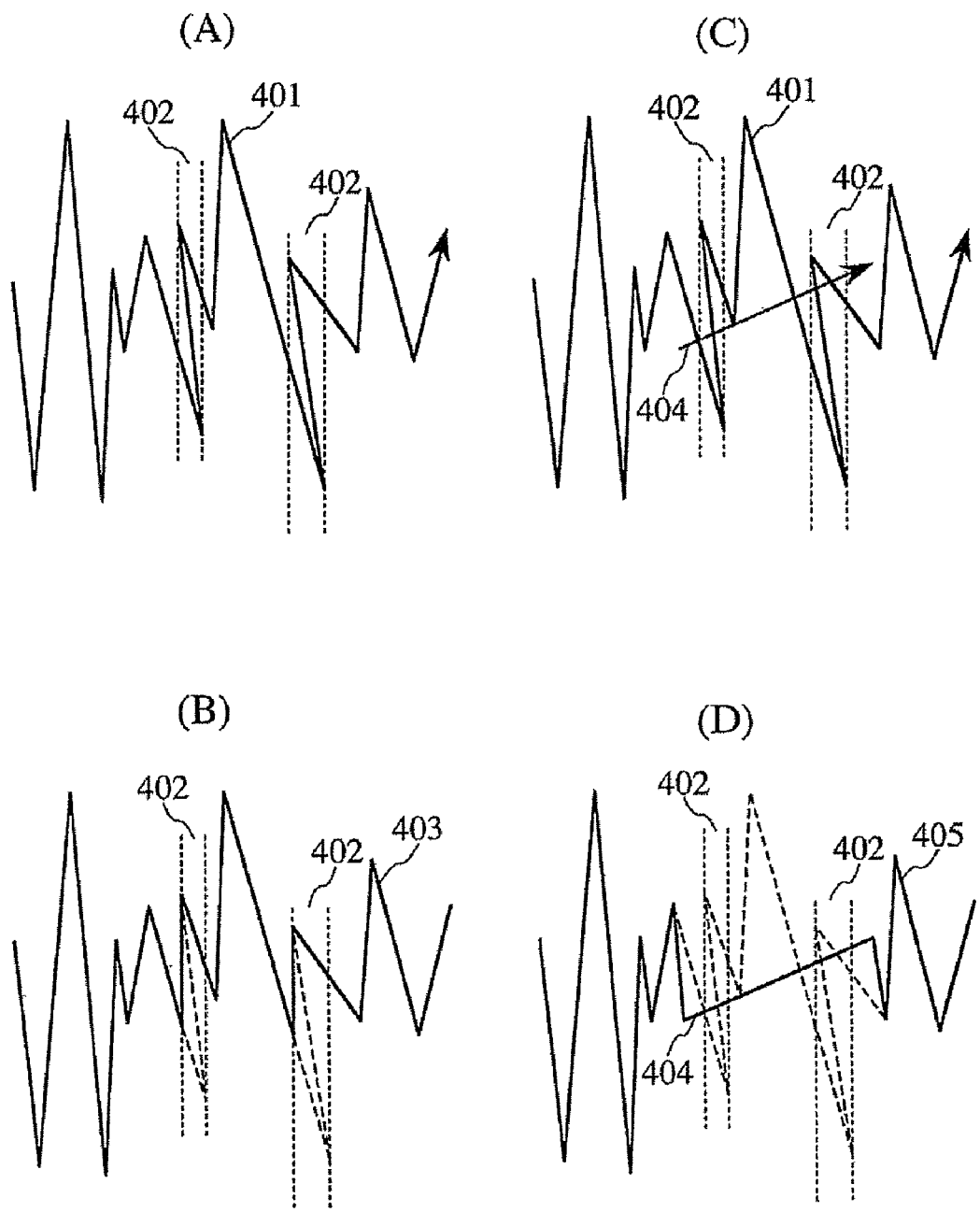
FIG. 4 are explanatory diagrams showing the locus of the movement of a pushed touch pen, and a shape of a graph line displayed in response to the movement.

FIG. 4 are explanatory diagrams showing how the locus of the movement of the pushed touch pen and the graph line resulting from the movement look. The following explanation will be made with reference to these diagrams.

FIG. 4 (a) shows the locus when the user draws a line zigzagging up and down by the touch pen. The shape of such a zigzag line 401 depicts a situation called pennant or flag in the temporal change of a stock price, in which the stock price fluctuates frequently in a short period. Since the elapse of the time flows from the left to the right, the locus of the zigzag line 401 as a whole has roughly extended from the left to the right.

When the user pushes and moves the touch pen to draw the zigzag line 401, the user cannot always let the touch pen advance from the left to the right but might sometimes allow it to return from the right to the left. This often happens especially when the user operates the touch pen in a hurry. If such a retrogressive motion occurs, a given x-coordinate point will have a plurality of corresponding y-coordinate values exist on the zigzag line 401. FIG. 4 (a) shows some such folded portions 402.

FIG. 4 (b) shows the shape of the graph line 403 that is actually entered when the zigzag line 401 having the folded portions 402 is drawn by the touch pen.

According to the present embodiment, a given point of time (on the horizontal axis) should have only one value (on the vertical line) as described above, but if a given point of time mistakenly has a plurality of values, the value that is entered last is used. Hence, a backward motion from the right to the left, if any, will necessarily be followed by a motion of the touch pen that heads from the left to the right, producing the newest locus, which is used as the graph line 403.

FIG. 4 (c) shows the locus of the touch pen's movement when the zigzag of a given portion of the zigzag line 401 drawn in FIG. 4 (a) is canceled so that the portion may be straight (parallel with the x axis). In FIG. 4 (c), a straight line 404 is drawn by the touch pen from the left to the right, after the zigzag line 401 is drawn by the touch pen.

With this operation, the effective y-coordinate value for a given x coordinate point is the one that is entered last. FIG. 4 (d) shows the shape of the graph line 405 that is actually entered, reflecting the straightened portion.

In a case where a deletion condition to be described later is not used, the straightened portion will be reflected irrespective of whether the touch pen is pushed and moved from the right to the left or from the left to the right along the straight line 404.

Figure 5:
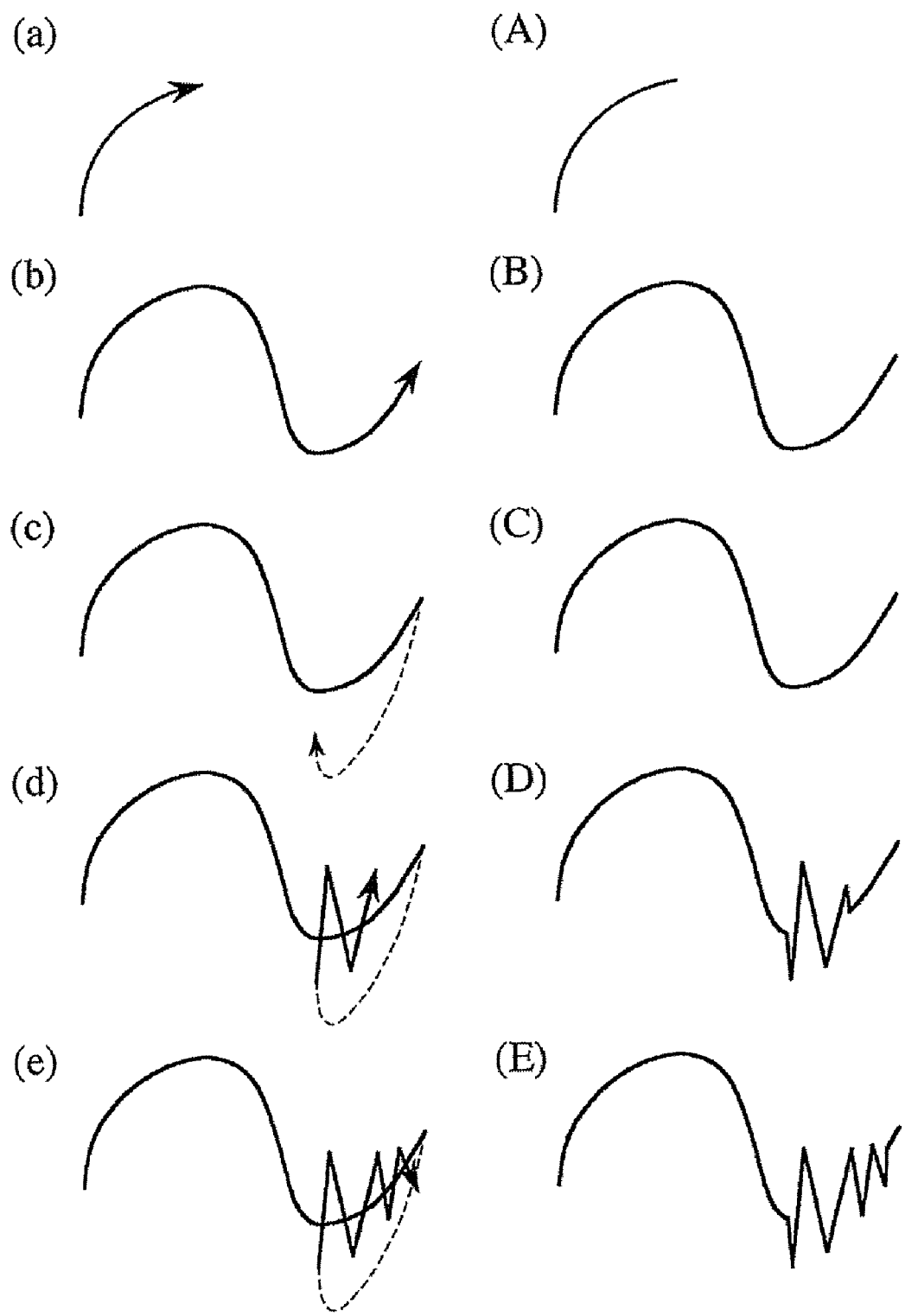
FIG. 5 are explanatory diagrams that explain the relationship between the locus of the movement of the touch pen and the shape of a line to be displayed on a screen.

FIG. 5 are explanatory diagrams that explain the relationships between the locus of the touch pen's movement and the shape of the line to be displayed on the screen. The following explanation will be made with reference to these diagrams.

FIGS. 5 (*a*) to (*e*) show the movement of the touch pen in time series. The arrow indicates the direction in which the touch pen moves. The solid line shows that the touch pen moves while pushing the touch panel. The broken line shows that the touch pen moves while being put off from the touch panel.

On the other hand, FIGS. 5 (A) to (E) show the shape of the line displayed on the screen at each point of time in the time series corresponding to FIGS. 5 (*a*) to (*e*).

When the touch pen is pushed to move roughly from the left to the right as shown in FIG. 5 (*a*), a line that has the same shape is drawn as shown in FIG. 5 (A). This is the same about FIG. 5 (*b*) and FIG. 5 (B).

After this, the touch pen is put off from the touch panel and moved as shown in FIG. 5 (*c*). Since the touch pen is away from the touch panel at this time and no instruction entry of the first kind is entered, the shape of the line displayed on the screen is the same between FIG. 5 (B) and FIG. 5 (C).

For example, consider a case where the line shown in FIG. 5 (B), which curves like a reversed S, needs to be changed at its terminal to a pennant shape. According to the present embodiment, this can be done by only moving the touch pen from the right to the left and starting a zigzag line from there as shown in FIG. 5 (*d*). FIG. 5 (D) is an example of how the zigzag line is displayed in its halfway state while being drawn, where the graph line is displayed as one continuous line.

FIG. 5 (*e*) shows the zigzag line being successively drawn. In response to this, one continuous line shape is displayed on the screen as shown in FIG. 5 (E).

According to the present embodiment, in a case where a graph is firstly roughly drawn (FIGS. 5 (*a*) and (*b*)) so that the graph may afterwards be partially corrected to a zigzag line, just drawing a zigzag line on the intended portion (FIGS. 5 (*d*) and (*e*)) produces one continuous graph. At this time, since the start point or the end point of the zigzag line needs not be overlaid on the rough line drawn before, the user can make this correction easily.

In the present embodiment, since the object to process is coordinate values of a line diagram such as a graph that takes a temporal axis in the horizontal direction, an orthogonal coordinate system is used as the coordinate system, x-coordinate value is used as the first coordinate value, and y-coordinate value is used as the second coordinate value. However, in some applications, x-coordinate and y-coordinate may be interchanged, or an oblique coordinate system or a polar coordinate system may be used. For example, for drawing a pie chart, the first coordinate value may represent angle and the second coordinate value may represent radius.

When the user enters a graph on an oblique coordinate system or a polar coordinate system, he/she tends to make an entry at an unintended position because the coordinate axes are not orthogonal or they curve. However, if the present application is employed, such an unintended entry can be appropriately corrected and coordinate values of a graph, which has a close shape to the user's desired shape, can be obtained.

(Deletion Condition)

As described above, even if a deletion condition is always set not to be satisfied, a sufficient level of graph drawing or graph correcting is available. However, there is a case when a portion of a graph needs to be deleted. Such a case is, for example, when a discontinuous line diagram needs to be drawn. Or there are many times when a user wants to once erase an unwanted graph and then newly draw a desired graph. Hence, a technique for erasing a portion of a graph line with a simple operation will be explained below.

When the user draws a graph, he/she pushes the touch pen to move it from the left to the right, as described above. Hence, according to the present embodiment, when erasing a graph, the user pushes and moves the touch pen from the right to the left over a range of the graph that needs to be erased.

However, for example, when drawing a zigzag line, the user might unintentionally move the touch pen from the right to the left for an instant, as described above.

In order that these cases are distinguished, a movement of the touch pen that continues for a certain period of time roughly horizontally from the right to the left should cause the graph to be erased, but a movement of the touch pen from the right to the left that does not continue for a certain period of time should be taken as a normal entry of coordinate values. A deletion condition is a criterion for this determination.

According to the present embodiment, the factor that corresponds to the "certain period of time" is "M×cycle of vertical synchronization interrupt". Namely, when the touch pen has moved roughly horizontally from the right to the left for "M×cycle of vertical synchronization interrupt", the range of the movement from the right to the left is deleted from the shape of the line.

According to the present embodiment, it is determined in the following manner whether or not "the touch pen has moved roughly horizontally from the right to the left for a period of the deletion condition of M×cycle of vertical synchronization interrupt".

Figure 6:
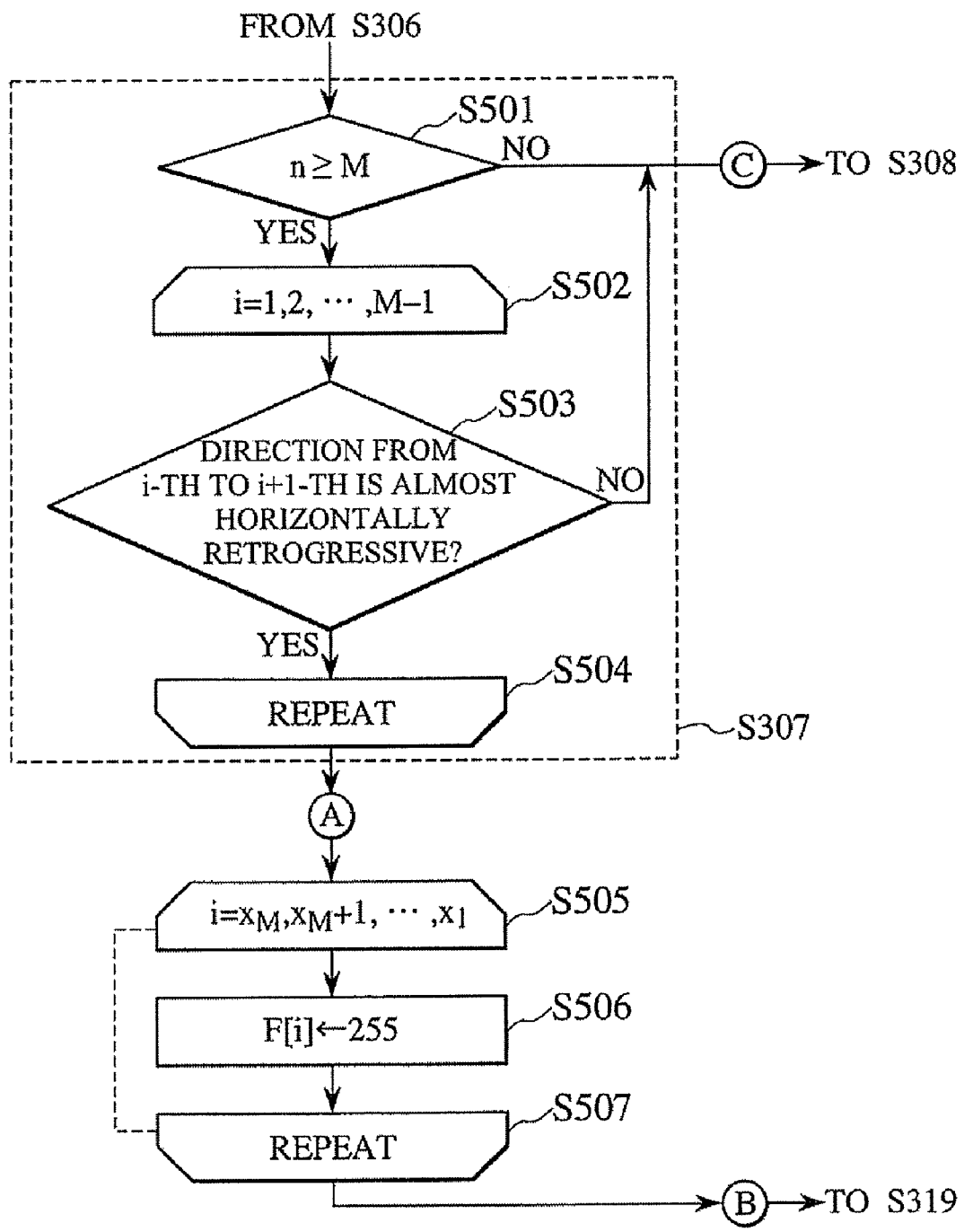
FIG. 6 is a flowchart showing a detailed control flow of a process performed when it is determined whether a deletion condition is satisfied or not and the condition is satisfied.

FIG. 6 is a flowchart showing a specific control flow of step S307, at which whether the deletion condition is satisfied or not is determined, and a process performed when the deletion condition is satisfied. The following explanation will be made with reference to this drawing.

When the flow starts, whether $n \geq M$ is true or not is firstly determined (step S501). In a case where it is $n < M$ (step S501; No), the flow terminates and goes to step S308 is performed.

On the other hand, in a case where $n \geq M$ is true (step S501; Yes), the coordinate points across which the touch pen has moved till now for M×cycle of vertical synchronization interrupt are logged in the ring buffer chronologically as $(x_1, y_1) = (R[(p-M) \bmod M] \cdot x, R[(p-M) \bmod M] \cdot y)$, $(x_2, y_2) = (R[(p-M+1) \bmod M] \cdot x, R[(p-M+1) \bmod M] \cdot y)$,

..., $(x_i, y_i) = (R[(p-M-1+i) \bmod M] \cdot x, R[(p-M-1+i) \bmod M] \cdot y)$,

..., $(x_M, y_M) = (R[(p-1) \bmod M] \cdot x, R[(p-1) \bmod M] \cdot y)$.

Further, a predetermined obtuse angle θ (typically, between an angle of 170 degrees to an angle of 180 degrees) is used, and it is determined that the touch pen horizontally moves in a case where the direction of the x axis and the direction of the movement of the touch pen make an angle equal to or larger than the obtuse angle θ.

Then, the following process is repeated while i is incremented in the range of i=1, 2, ..., M−1 (step S502).

First, it is determined whether $x_{i+1} < x_i$ is true and whether $|(y_{i+1}-y_i)/(x_{i+1}-x_i)| \leq \tan\theta$ is true, i.e., whether the direction vector of the touch pen's movement between the point logged in the i-th order and the point logged in the (i+1)th order, namely $$(x_{i+1}-x_i, y_{i+1}-y_i)$$

makes an angle equal to or larger than the obtuse angle θ with the positive direction of the x axis, so that it is determined whether the touch pen has moved retrogressively in almost the horizontal direction (step S503).

In a case where this condition is not satisfied (step S503; No), the flow terminates and goes to step S308. On the other hand, in a case where the condition is satisfied (step S503; Yes), the process from step S502 to step S504 is repeated.

When the above condition is satisfied for all of i=1, 2, ..., M−1, the deletion condition is satisfied. So the flow goes to step S505.

When the deletion condition is satisfied, $$x_M < x_{M-1} < \ldots < x_2 < x_1$$

is true. Therefore, the largest x-coordinate value of the latest M logs is $x_1$, and the smallest x-coordinate value is $x_M$.

Then, the following process is repeated for each i=$x_M$, $x_M+1$, ..., $x_1-1$, $x_1$ (step S505).

Namely, $$F[i]=255$$

is performed in the coordinate storage unit 203 (step S506), and this is repeated (step S507).

By this process, the section from the x-coordinate value $x_M$ inclusive to the x-coordinate value $x_1$ inclusive is removed from the shape of the line, which often results in that the line is discontinuous.

When the repetition (step S505 to step S507) is completed, the flow terminates and goes to step S319.

Figure 7:
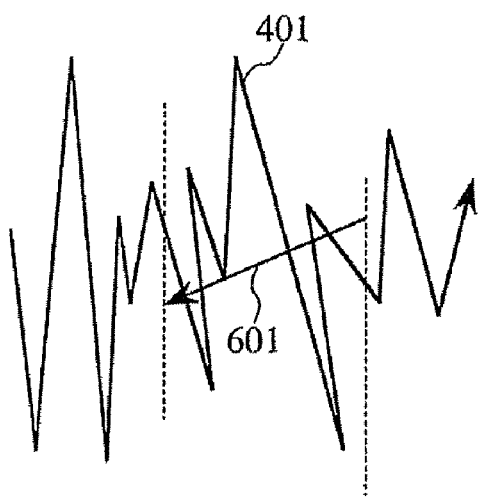
FIG. 7 are explanatory diagrams showing the shape of a line that is entered when a user moves the touch pen from the right to the left.
Figure 7:
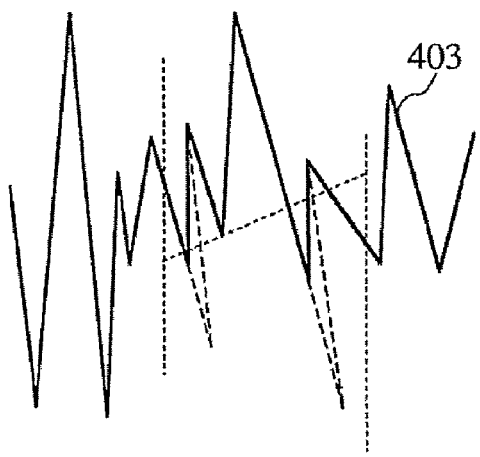
Figure 7:
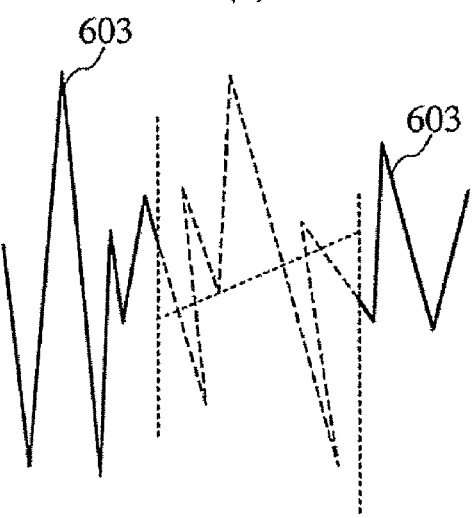

FIG. 7 are explanatory diagrams showing the shape of the line entered when the user moves the touch pen from the right to the left. The following explanation will be made with reference to these drawings.

FIG. 7 (a) shows the path of the touch pen moved by the user. Specifically, FIG. 7 (a) shows the "record of the path of the pushing operation" when the user moves the touch pen along the zigzag line 401 same as that in FIG. 4 while pushing the touch panel by the touch pen, puts the touch pen off from the touch panel, then again places the pen to move it along a roughly horizontal erasing line 601 from the right to the left while pushing the touch panel by the touch pen, and finally puts off the touch pen.

FIG. 7 (b) shows an "example screen display" of the shape of the graph line 403, which is displayed by the line shape processing device immediately after the user moves the touch pen along the zigzag line 401 while pushing the touch panel by the touch pen. FIG. 7 (b) shows the same shape as that in FIG. 4 (b). Namely, FIG. 7 (b) shows, as an example display, the shape of the graph line 403 that complies with the zigzag line 401 indicating the record of the touch pen running across the touch panel.

FIG. 7 (c) shows an "example screen display" of the shape of the graph line 603, which is displayed by the line shape processing device immediately after the user moves the touch pen along the erasing line 601 while pushing the touch panel by the touch pen. As shown in FIG. 7 (c), the graph line 603 has a shape discontinuous in the middle.

This is because when the touch pen is moved horizontally along the erasing line 601 for a certain period of time continuously with the touch pen pushing the touch panel, the horizontal range of the movement is deleted from the shape of the graph line 403.

As obvious from the above, according to the present embodiment, the user can delete a portion of the shape of a line with a simple operation, and can easily correct or edit the shape of the line.

(Various Processes for Coordinate Values)

A technique for detecting shape of lines that is used particularly to record fluctuation of a stock price will now be explained. When the line shape entered by the above-described technique is seen as a graph that represents temporal developments of a stock price, the present technique can be used to detect the characteristics of the changes of the stock price.

Figure 8:
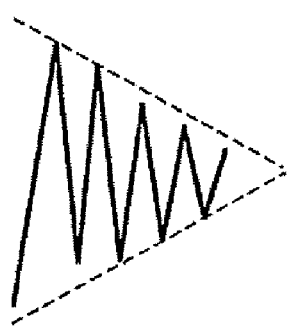
FIG. 8 are explanatory diagrams showing shapes of pennants and flags.
Figure 8:
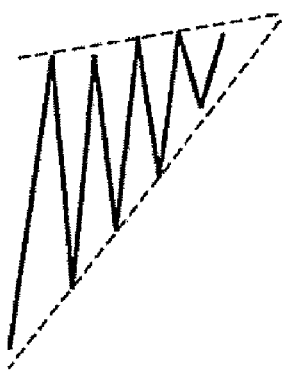
Figure 8:
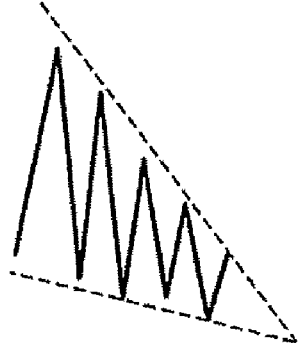
Figure 8:
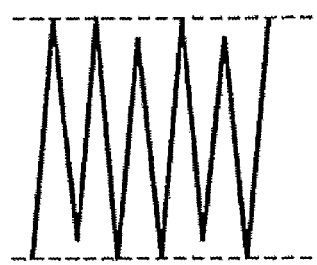
Figure 8:
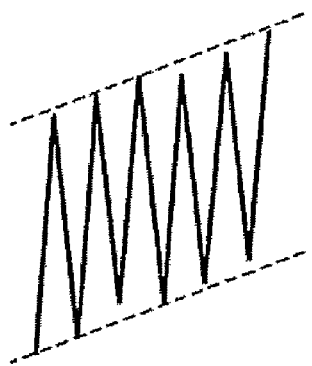
Figure 8:
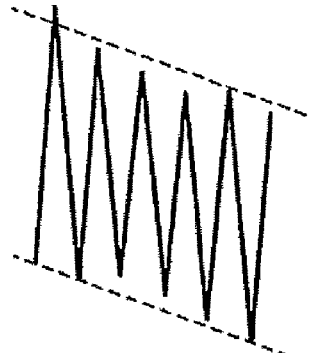

Shapes characteristic of the course of stock price changes include shapes called pennant and flag. FIG. 8 are explanatory diagrams showing how pennant shapes and flag shape look. The following explanation will be made with reference to these drawings.

FIGS. 8 (a), (b), and (c) show so-called pennant shapes, representing that price movements are sharp at the beginning, but converge as the time goes. That is, these shapes show that the prices fluctuate (zigzag) while gradually narrowing the amplitude of fluctuations. Here, price ups and downs that average at almost the same level are called simply "pennant" or "horizontal pennant" (FIG. 8 (a)). Ups and downs that average at ascending levels are called "ascending pennant" (FIG. 8 (b)). Those that average at descending levels are called "descending pennant" (FIG. 8 (c)).

On the other hand, FIGS. 8 (d), (e), and (f) show so-called flag shapes, representing that the amplitude of price movements is kept almost unchanged. That is, the shapes show that the prices fluctuate (zigzag) within almost the same amplitude of fluctuation. Fluctuations that average at almost the same level are called simply "flag" or "horizontal flag" (FIG. 8 (d)). Fluctuations that average at ascending levels are called "ascending flag" (FIG. 8 (e)). Fluctuations that average at descending levels are called "descending flag" (FIG. 8 (f)).

In the course of stock price movements, a critical pennant or flag is one that has occurred most recently (most lately). Hence, when detecting a pennant or flag, it is necessary to determine whether the pennant or flat exists at nearly the end of the graph (in the situation of the above embodiment, whether the pennant or flag shape appears at the largest x-coordinate point).

In the above-described embodiment, a line shape is stored in the array F in the coordinate storage unit 203. Accordingly, it is possible to detect a pennant or flag by checking the contents of the array F. The process of this detection will now be specifically explained.

Figure 9:
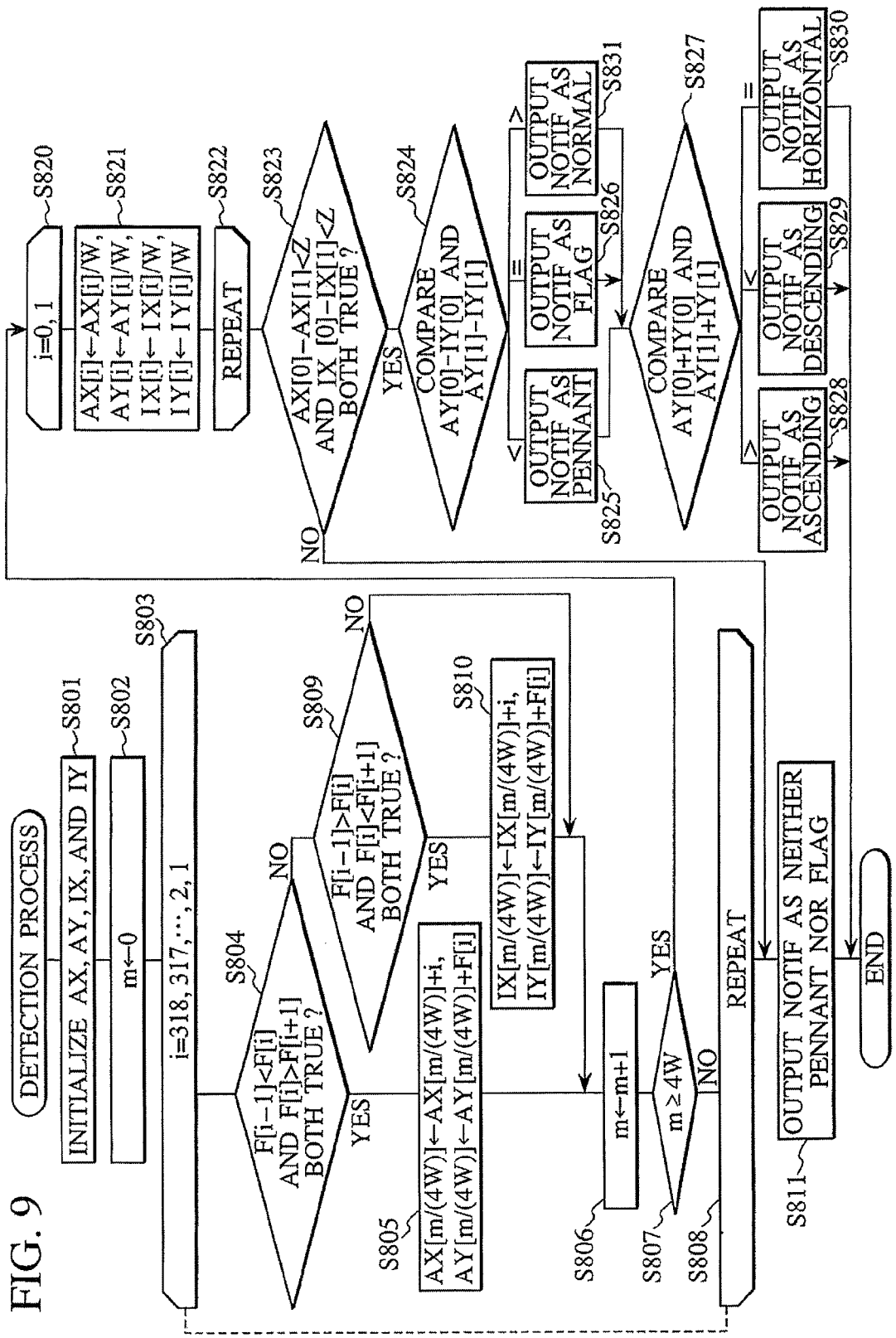
FIG. 9 is a flowchart showing a control flow of a detection process for detecting whether a line shape includes the shape of a pennant or flag.

According to the present embodiment, any pennant or flat is spotted based on local maximum points and local minimum points of a line shape, and the range of x-coordinate values taken by these points. FIG. 9 is a flowchart showing the control flow of the detection process of detecting whether or not a line shape includes a pennant or flag shape. The following explanation will be made with reference to this flowchart.

In this process, the following constants and temporary variables are used.

Constant W; used for extracting 2W number of local maximum points and 2W number of local minimum points.

Arrays AX and AY; used for storing partial sum and average of local maximum points for x-coordinate values and y-coordinate values respectively; each array includes two elements, as the local maximum points are split into a former half group and a latter half group.

Arrays IX and IY; used for storing partial sum and average of local minimum points for x-coordinate values and y-coordinate values respectively; each array includes two elements, as the local minimum points are split into a former half group and a latter half group.

Threshold constant Z; used for determining that a range of x-coordinate values taken by the 2W number of local maximum points and so many local minimum points represents a pennant or flag; if a range of x-coordinate values is equal to or smaller than Z, this means that the prices sharply go up and down, showing a situation of a pennant or flag, while if not, prices moderately go up and down, showing neither a pennant nor a flag.

When this process is started, the CPU 102 accesses the RAM 103 and initializes the arrays AX, AY, IX, and IY (step S801). Specifically, the CPU 102 performs, for each i=0, 1, AX[i]←0, AY[i]←0, IX[i]←0, and IY[i]←0.

Next, the CPU 102 initializes a variable m that counts the number of local maximum points and local minimum points that have been detected till the present time (step S802). Specifically, the CPU 102 performs m←0.

Then, the CPU 102 repeats the following process for i=318, 317, ..., 2, 1 by decrementing i by 1 (step S803).

First, the CPU 102 determines whether or not F[i−1]<F[i] and F[i]>F[i+1] are both true at the same time, i.e., whether or not F[i] is a local maximum point (step S804). If so (step S804; Yes), the CPU 102 performs AX[m/(4W)]←AX[m/(4w)]+i, and AY[m/(4W)]←AY[m/(4w)]+F[i] (step S805) to accumulate the x-coordinate values and the y-coordinate values of the local maximum points. Note that "a/b" indicates an integer division of a by b (integer division rounds down any remainder).

Then, the CPU 102 performs m←m+1 (step S806). If, as a result, it becomes m≧4W (step S807; Yes), the CPU 102 gets out of the repetition to advance to step S820. If not (step S807; No), the CPU 102 starts the next round of repetition (step S808).

On the other hand, if F[i] is not a local maximum point (step S804; No), the CPU 102 determines whether or not F[i−1]>F[i] and F[i]<F[i+1] are both true at the same time, i.e., whether or not F[i] is a local minimum point (step S809). If so (step S809; Yes), the CPU 102 performs IX[m/(4W)]←IX[m/(4w)]+i, and IY[m/(4W)]←IY[m/(4w)]+F[i] (step S810) to accumulate the x-coordinate values and the Y-coordinate values of the local minimum points. Then, the CPU 102 advances to step S806.

Here, if the repetition (step S803 to step S808) is finished straight, which means that the total number of local maximum points and local minimum points that have been detected does not reach the required level, the CPU 102 outputs a notification that the line shape is neither a pennant nor a flag (step S811) and terminates the process. The notification may be output to an information storage position in the RAM 103 so that it may be handled by any other functional unit, or may be presented to the user.

On the other hand, if the repetition is exited halfway (step S807; Yes), the CPU 102 repeats the following process for each i=0, 1 (step S820). Namely, the CPU 102 performs AX[i]←AX[i]/W, AY[i]←AY[i]/W, IX[i]←IX[i]/W, and IY[i]←IY[i]/W (step S821), and repeats this substitution (step S822).

In the repetition of step S803 to step S808, the value of i is decremented by 1 while the value of m increases by 1. The element of each of AX, AY, IX, and IY that is suffixed with the smaller number stores the information about a portion of the graph that is on the side where i takes larger values (i.e., the right side or the temporally latest side), and the element of each of AX, AY, IX, and IY that is suffixed with the larger number stores the information about a portion of the graph that is on the side where i takes smaller values (i.e., the right side or the temporally older side). Hence, step S822 results in that:

(AX[0], AY[0])—the average (median point) of the latest local maximum points;

(AX[1], AY[1])—the average (median point) of the older local maximum points;

(IX[0], IY[0])—the average (median point) of the latest local minimum points; and (IX[1], IY[1])—the average (median point) of the older local minimum points.

Figure 10:
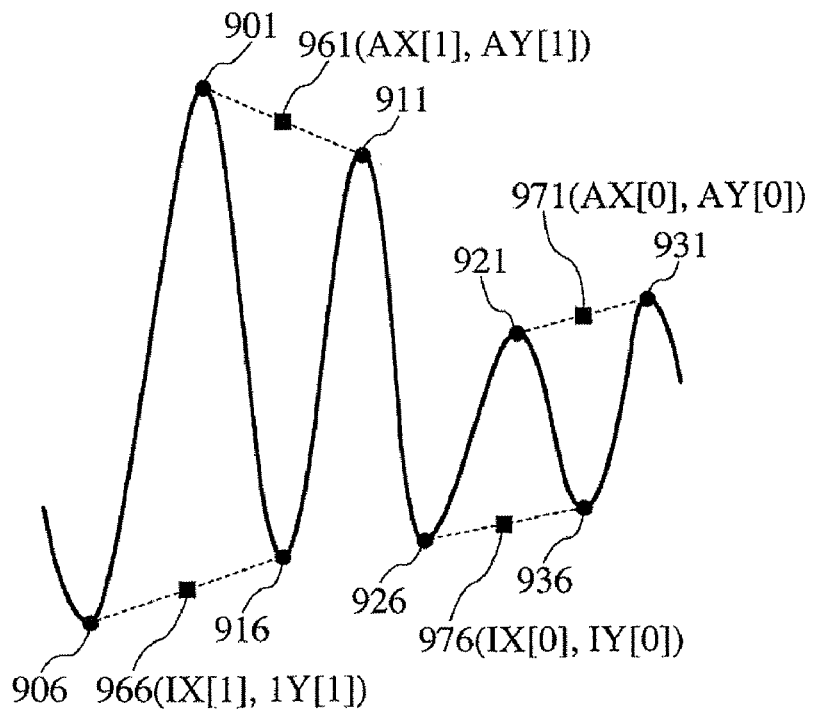
FIG. 10 is an explanatory diagram showing positional relationship among local maximum point, local minimum points, and their median points.

FIG. 10 is an explanatory diagram showing the positional relationship among the local maximum points, the local minimum points, and their median points. The diagram illustrates a case of W=2. The following explanation will be made with reference to this diagram.

As shown in FIG. 10, local maximum points 931, 921, 911, and 901, and local minimum points 936, 926, 916, and 906 have been detected in the latest-to-older direction.

When drawing a graph in time series, it is common to draw it to temporally shift from the left to the right. Therefore, the right-hand side of the screen is the "latest" side, and the left-hand side of the screen is the "older" side.

The median point 961 between the older local maximum points is located at the middle point between the local maximum points 901 and 911, and the median point 971 between the latest local maximum points is located at the middle point between the local maximum points 921 and 931. The median point 966 between the older local minimum points is located at the middle point between the local maximum points 906 and 916, and the median point 976 between the latest local minimum points is located at the middle point between the local maximum points 926 and 936.

The CPU 102 determines whether the situation is a pennant or a flag, or ascending, descending, or horizontal, based on the positional relationship among these median points 961, 966, 971, and 976.

First, the CPU 102 determines whether AX[0]-AX[1]<Z and IX[0]-IX[1]<Z are true or not (step S823). If not (step S823; No), the CPU 102 goes to step S811, as the price movements are not temporally sharp.

On the other hand, if true (step S823; Yes), the CPU 102 compares AY[0]-IY[0] with AY[1]-IY[1] (step S824). If the former is smaller than the latter (step S824; <), the CPU 102 outputs a notification that the situation is a "pennant" (step S825). If the former and the latter are (approximately) the same (step S824; =), the CPU 102 outputs a notification that the situation is a "flag" (step S826). If the former is larger than the latter (step S824; >), the CPU 102 outputs a notification that the situation is "normal" (step S831). Here, being "normal" means that the situation is neither a "pennant" nor a "flag".

Further, the CPU 102 compares AY[0]+IY[0] with AY[1]+IY[1] (step S827). If the former is larger than the latter (step S827; >), the CPU 102 outputs a notification that the situation is "ascending" (step S828). If the former is smaller than the latter (step S827; <), the CPU 102 outputs a notification that the situation is "descending" (step S829). If the former and the latter are (approximately) the same (step S827; =), the CPU 102 outputs a notification that the situation is "horizontal" (step S830), and terminates the process.

In the comparisons at step S824 and step S827, with a predetermined margin of error taken into consideration, it is typical to determine that the two values are "(approximately) the same" when they fall within that margin.

In the present embodiment, step S827 comes after step S831, at which "normal" is output. However, step S811 may instead come after step S831 so that the determination whether "ascending", "descending", or "horizontal" may not be made in the case of "normal".

According to this process, it is possible to detect the shape of a line used for depicting stock price movements in particular.

(Degree of Similarity Between Line Shapes)

In the above embodiment, line shape characteristics are extracted based on the mean positions (median points) of local maximum points and local minimum points. There are many cases where the degree of similarity between more than one lines needs to be figured out. For example, consider an advanced use in which the user enters temporal stock price movements by the touch pen to search out a stock name that follows similar movements. In such a case, it is necessary to calculate the degree of similarity between line shapes by appropriately utilizing characteristics extracted in the above-described manner. The following will explain a technique for calculating the degree of similarity between line shapes for such a case.

In order to compare the shapes of two lines, it is first necessary to appropriately normalize the two lines. Here, a case will be considered, in which, in line with the above-described embodiment, the x axis is set horizontally from the right to the left while the y axis is set vertically from the bottom up, and the lines to be compared lie in this x-y plane.

First, in a case where the two lines extend horizontally over ranges of different lengths (ranges in the x-axis direction), one of the two is extended or shortened horizontally (in the x-axis direction) to convert them to be equally long horizontally. At this time, if the ratio of length between the two lines is larger than a given constant (e.g., 2, 3, or 5) or smaller than another constant (e.g., 0.5, 0.333, or 0.2), the two lines are too differently long. Therefore, it is preferred that they should be determined as "similarity determination impossible" or "dissimilar".

Further, in a case where a line is discontinuous at some point, the missing part may be appropriately interpolated (by simply filling a line segment in the part, or by using spline interpolation, or the like), or the latest one (the most right-hand side one) of the plurality of lines may be selected.

Furthermore, both the lines may be extended or shortened horizontally. Typically, both the lines are shortened.

For example, in the above-described embodiment, the coordinate storage unit 203 stores the values F[i] for i= 0, . . . , 319. In order for them to be shortened to a range of length W so that corresponding values for k=0, 1, . . . , W−1 may be stored as values f[k], the following calculation may be performed:

$$f[k] = \sum_{i=0}^{W/320} F[kW/320 + i](W/320)$$

so that the values f[k] for k, transformed from the values F[i], may take the average of the values F[i] for i=kW/320, kW/320+1, . . . , (k+1)W/320−1.

In the following explanation, for better understanding, it is assumed that either line shape to be considered is a result of an appropriate selection or conversion, so the line is not discontinuous and has been normalized to a range of length W.

The RAM 103 stores the normalized results about the two lines in the arrays f and g each including a W number of elements. The arrays f and g represent the lines themselves.

Then, the median point of each of the two lines f and g is calculated in order to make them be included within a vertical range of the same length. In the above-described embodiment, the lines are plotted at y-coordinate points f[i] and g[i] respectively, at an x-coordinate point i. Therefore, the heights p and q of the median points of the lines in the y-axis direction can be calculated by $$p = \sum_{i=0}^{W-1} F[i]/W$$

$$q = \sum_{i=0}^{W-1} G[i]/W.$$

Then, the difference Δ[i] between the heights of y-coordinate values of the two lines f and g at the same x-coordinate value [i] can be calculated by Δ[i]=(F[i]−p)−(G[i]−q).

Then, the degree of similarity L(f, g) between the two lines can be calculated by the following formula using sum of squares.

$$L(f, g) = \sum_{i=0}^{W-1} \Delta[i]^2$$

That is, the idea here is to consider that the two lines f and g are more similar, as L(f, g) are smaller.

However, as in the case of stock price movements, what is considered critical is whether the shape is a flag or a pennant or how the prices move in the latest period. Meanwhile, compressing the information of the range including 320 elements to the range W as described above is equal to eliminating high-frequency components. Hence, the information about a flag or pennant, which is a very high-frequency component, is omitted.

Hence, it is preferred to previously determine whether lines F and G, uncompressed versions of the two lines f and g, are each a "flag", a "pennant", or a "non-flag and non-pennant (hereinafter, "normal"), by the technique of the above-described embodiment, and calculate the degree of similarity based on the obtained information.

For this purpose, the following W number of positive weighting parameters are used.

w[0], w[1], . . . , w[W−1]

These weighting parameters are in any of the following relationships expressed with a constant N (0<N<W), depending on whether the shape of the original lines F and G before the two lines f and g are converted is a "flag", a "pennant", or "normal". Here, it is preferred that the range of horizontal length before compression, which is represented by W−N, be equal to Z in the above-described embodiment.

(1) If the lines are both "normal", w[0]=w[1]= . . . w[N−1]=1=w[N]=W[N+1]= . . . =
W[W−1]=1

(2) If the lines are both a "flag" or if the lines are both a "pennant", $$w[0]=w[1]=\ldots w[N-1]=1>w[N]=W[N+1]=\ldots = W[W-1]=\mathit{ffpp}=0.5$$

(3) If one is "normal" and the other is a "flag" or a "pennant", with the constant N (0<N<W), $$w[0]=w[1]=\ldots w[N-1]=1<w[N]=W[N+1]=\ldots = W[W-1]=\mathit{nfp}=2$$

(4) If one is a "flag" and the other is a "pennant", with the constant N (0<N<W), $$w[0]=w[1]=\ldots w[N-1]=1<w[N]=W[N+1]=\ldots = W[W-1]=\mathit{fp}=0.8$$

The degree of similarity is defined as shown below.

$$L(f, g) = \sum_{i=0}^{W-1} w[i]\Delta[i]^2$$

What is done here is to reflect the movements of the line shapes to the degree of similarity by approximately varying the weight on i=N, N+1, ..., W−1, in which section a flag or a pennant may possibly exist.

As shown above, the weight is varied among ffpp=0.5, nfp=2, and fp=0.8. However, as long as these constants satisfy the following relationship:

ffpp<fp<1<nfp, they may take other values than those shown above. Further, the parameters may be set such that w[N], w[N+1], ..., w[W−1] take a constant that is varied to monotonously change from 1 to ffpp, fp, and to nfp.

In this way, by determining a weight w for arrays f and g that are free of the high-frequency components of two lines F and G, based on the shape characteristics of any of "flag", "pennant", and "normal" detected for F and G each, and calculating the degree of similarity L(f, g) based on these information, it is possible to determine how much they are similar.

Accordingly, when shape data of a plurality of lines $G_1, \ldots, G_D$ have been databased, the degree of similarity between each of them and the shape of a line F entered by the user can be calculated and the data can be sorted in the ascending order of the calculated degrees of similarity, so that any of the lines $G_1, \ldots, G_D$ that has a similar shape to F can be appropriately presented to the user, or the user may be allowed to select the one, as the case may be.

Figure 11:
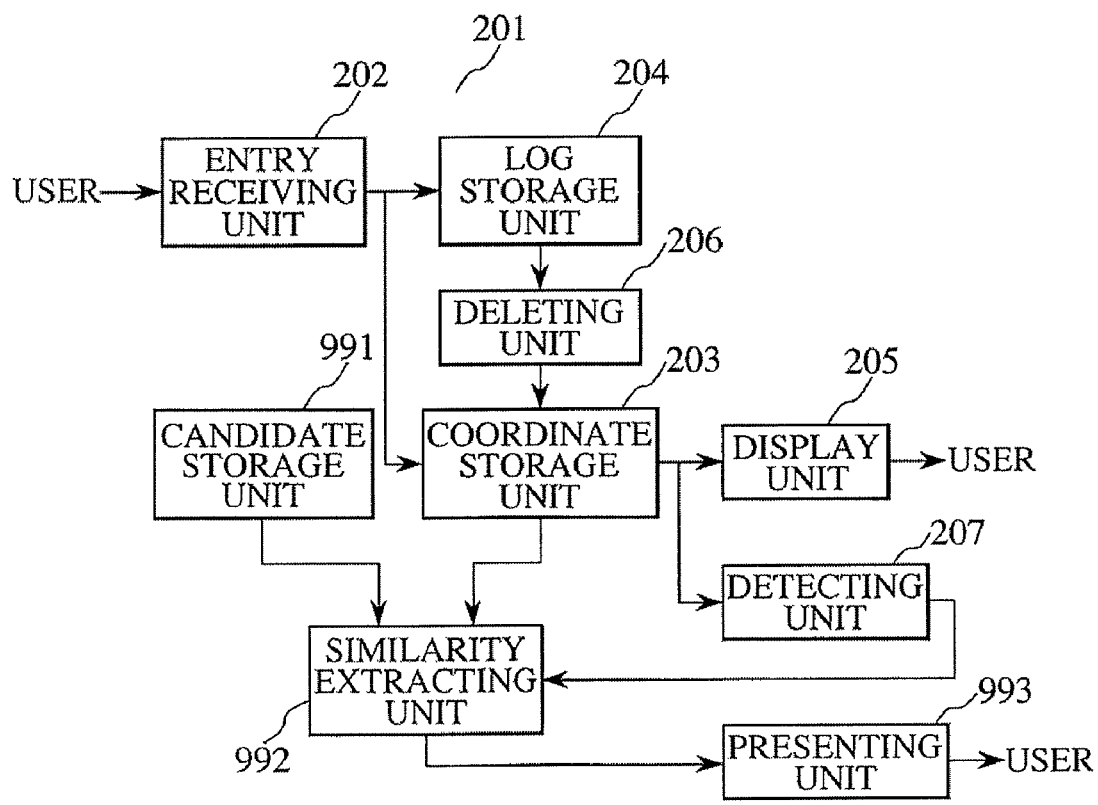
FIG. 11 is an explanatory diagram showing a schematic configuration of a line shape processing device according to the present embodiment.

FIG. 11 is an exemplary diagram showing a schematic configuration of a line shape processing device that realizes such a mode. The following explanation will be made with reference to this diagram. Among the elements shown in the diagram, those that have the same functions as those shown in FIG. 2 will be denoted by the same reference numerals, and for better understanding, the explanation will be made on elements that have different functions.

The line shape processing device 201 has a candidate storage unit 991, a similarity extracting unit 992, and a presenting unit 993.

The candidate storage unit 991 pre-stores shape data of a plurality of lines $G_1, \ldots G_D$. The candidate storage unit 991 is equivalent to a database for stock price movements. These data may be updated as the time goes. However, in a case where fixed values are used to allow for such an application as computer simulation, by preliminarily determining each shape as any of a "flag", a "pennant", or "normal", and preliminarily preparing arrays $g_1, \ldots, g_D$ that represent the shapes after being converted to a range W, it is possible to facilitate the process of calculating the degrees of similarity.

The similarity extracting unit 992 compares the plurality of lines $G_1, \ldots, G_D$ against the shape of a line F entered by the user and stored in the coordinate storage unit 203, based on the result of detection by the detecting unit 207 whether the line F is a "flag", a "pennant", or "normal", and based on the calculation of degrees of similarity with the weighting effect as described above, in order to sort the plurality of lines $G_1, \ldots, G_D$, or to calculate their degrees of similarity in turn and compare each degree with the degrees obtained earlier to keep a predetermined limited number of degrees with smaller values to extract the predetermined number of lines that are similar to the line F from the plurality of lines $G_1, \ldots, G_D$.

The presenting unit 993 presents the user the information of the lines that rank in the top predetermined number of orders as having been extracted as being similar to the line F, and gets itself ready for a succeeding process. For example, the presenting unit 993 displays, together with the extracted lines, brief information about the stock names associated with the lines. When the user selects any of those extracted, the presenting unit 993 presents detailed information about the stock name associated with the selected line.

According to the present embodiment, when stock price movements or the like are expressed by a graph, the degree of similarity of the graph can be calculated based on a matter of interest, and the user can feel convenient when searching for a desired stock name based on the stock price movements.

The present application claims priority to Japanese Patent Application No. 2006-172206, the content of which is incorporated herein provided that the designated state allows for incorporation by law.

INDUSTRIAL APPLICABILITY

As explained above, according to the present invention, it is possible to provide a line shape processing device and line shape processing method suitable for receiving an entry of a line shape via a mouse, a touch panel, or the like and processing the line shape, a computer readable information recording medium storing a program for realizing these device and method on a computer, and the program.

The invention claimed is:

1. A line shape processing device that processes shapes of lines laid in a two-dimensional region with each of positions taken by the lines in said two-dimensional region designated by a first coordinate value and a second coordinate value, realized by executing a program stored in a non-transitory computer-readable information recording medium, comprising:

an entry receiving unit that receives an instruction entry of a first kind, which designates a position of a point included in a line to be laid in said two-dimensional region, and an instruction entry of a second kind, which is different from the instruction entry of said first kind;

a storage unit that, in a case where instruction entries of said first kind are continuously received, stores, for each first coordinate value included in a range from a first coordinate value of a start position designated by an older one of the instruction entries of said first kind to a first coordinate value of an end position designated by a later one of the instruction entries of said first kind, a second coordinate value of a point having the first coordinate value concerned and included in a line segment joining said start position and said end position, the second coordinate value being stored in association with the first coordinate value concerned;

a display unit that displays a shape of the line laid in said two-dimensional region, by acquiring, in a predetermined order regarding the first coordinate values, the second coordinate values stored in said storage unit in association with the first coordinate values, and plotting dots at positions on a screen that are associated with such positions within said two-dimensional region as designated by the first coordinate values associated with the acquired second coordinate values and the second coordinate values; and a deleting unit that, in a case where instruction entries of said first kind are received continuously a predetermined number of times, and in a case where, for every pair of instruction entries of said first kind that adjoin each other among the instruction entries of said first kind received continuously, a vector that runs from a position designated by an older one of the instruction entries of said first kind in the pair concerned to a position designated by a later one of the instruction entries of said first kind in the pair concerned makes an angle equal to or larger than a predetermined obtuse angle with a vector that runs in a direction in which only first coordinate values shift in said predetermined order in said two-dimensional region, deletes from said storage unit, second coordinate values stored in said storage unit in association with first coordinate values that are included in a range defined by a smallest value and a largest value among first coordinate values respectively designated by the instruction entries of said first kind received continuously.

2. The line shape processing device according to claim 1, wherein in a case where an instruction entry of said first kind is received continuously after an instruction entry of said second kind is received, said storage unit stores a second coordinate value of a point designated by the instruction entry of said first kind in association with a first coordinate value of the point.

3. The line shape processing device according to claim 1, wherein said entry receiving unit receives a pushing operation into a surface of said screen as an instruction entry of said first kind that designates such a position within said two-dimensional region as associated with a position that receives the pushing operation, and receives a detaching operation away from the surface of said screen as an instruction entry of said second kind.

4. The line shape processing device according to claim 1, wherein first coordinate values are represented by integers, and in a case where a first coordinate value of a dot plotted and a first coordinate value of a dot plotted immediately before adjoin each other, said display unit further draws a line segment that joins the dot plotted and the dot plotted immediately before.

5. The line shape processing device according to claim 4, wherein said storage unit stores, as element of an array indexed by each first coordinate value, a second coordinate value or a value that indicates that a second coordinate value to be associated with the first coordinate value has been deleted, and said display unit acquires a second coordinate value associated with each first coordinate value by scanning elements of said array in a manner that indices of said array shift in said predetermined order.

6. The line shape processing device according to claim 1, wherein a coordinate axis in a horizontal direction and a coordinate axis in a vertical direction are set in said two-dimensional region, and first coordinate values are coordinate values on the coordinate axis in the horizontal direction, and second coordinate values are coordinate values on the coordinate axis in the vertical direction.

7. The line shape processing device according to claim 1, wherein a coordinate axis in a horizontal direction and a coordinate axis in a vertical direction are set in said two-dimensional region, and first coordinate values are coordinate values on the coordinate axis in the horizontal direction, and second coordinate values are coordinate values on the coordinate axis in the vertical direction, and the direction in which only first coordinate values shift in said predetermined order heads from left to right in the horizontal direction.

8. The line shape processing device according to claim 1, wherein a coordinate system of polar coordinate points is set in said two-dimensional region, and first coordinate values are coordinate values representing an angle of the polar coordinate points while second coordinate values are coordinate values representing a radius of the polar coordinate points.

9. A line shape processing method for processing shapes of lines laid in a two-dimensional region with each of positions taken by the lines in said two-dimensional region designated by a first coordinate value and a second coordinate value, realized by executing a program stored in a non-transitory computer-readable information recording medium, comprising:

an entry receiving step of receiving an instruction entry of a first kind, which designates a position of a point included in a line to be laid in said two-dimensional region, and an instruction entry of a second kind, which is different from the instruction entry of said first kind;

a storing step of, in a case where instruction entries of said first kind are continuously received, storing into a storage unit, for each first coordinate value included in a range from a first coordinate value of a start position designated by an older one of the instruction entries of said first kind to a first coordinate value of an end position designated by a later one of the instruction entries of said first kind, a second coordinate value of a point having the first coordinate value concerned and included in a line segment joining said start position and said end position, the second coordinate value being stored in association with the first coordinate value concerned;

a displaying step of displaying a shape of the line laid in said two-dimensional region, by acquiring, in a predetermined order regarding the first coordinate values, the second coordinate values stored in association with the first coordinate values from said storage unit, and plotting dots at positions on a screen that are associated with such positions within said two-dimensional region as designated by the first coordinate values associated with the acquired second coordinate values and the second coordinate values; and a deleting step of, in a case where instruction entries of said first kind are received continuously a predetermined number of times, and in a case where, for every pair of instruction entries of said first kind that adjoin each other among the instruction entries of said first kind received continuously, a vector that runs from a position designated by an older one of the instruction entries of said first kind in the pair concerned to a position designated by a later one of the instruction entries of said first kind in the pair concerned makes an angle equal to or larger than a predetermined obtuse angle with a vector that runs in a direction in which only first coordinate values shift in said predetermined order in said two-dimensional region, deleting from said storage unit, second coordinate values stored in said storage unit in association with first coordinate values that are included in a range defined by a smallest value and a largest value among first coordinate values respectively designated by the instruction entries of said first kind received continuously.

10. A non-transitory computer-readable information recording medium that stores a program for controlling a computer to process shapes of lines laid in a two-dimensional region with each of positions taken by the lines in said two-dimensional region designated by a first coordinate value and a second coordinate value, said program controlling said computer to function as:

an entry receiving unit that receives an instruction entry of a first kind, which designates a position of a point included in a line to be laid in said two-dimensional region, and an instruction entry of a second kind, which is different from the instruction entry of said first kind;

a storage unit that, in a case where instruction entries of said first kind are continuously received, stores, for each first coordinate value included in a range from a first coordinate value of a start position designated by an older one of the instruction entries of said first kind to a first coordinate value of an end position designated by a later one of the instruction entries of said first kind, a second coordinate value of a point having the first coordinate value concerned and included in a line segment joining said start position and said end position, the second coordinate value being stored in association with the first coordinate value concerned;

a display unit that displays a shape of the line laid in said two-dimensional region, by acquiring, in a predetermined order regarding the first coordinate values, the second coordinate values stored in said storage unit in association with the first coordinate values, and plotting dots at positions on a screen that are associated with such positions within said two-dimensional region as designated by the first coordinate values associated with the acquired second coordinate values and the second coordinate values; and a deleting unit that, in a case where instruction entries of said first kind are received continuously a predetermined number of times, and in a case where, for every pair of instruction entries of said first kind that adjoin each other among the instruction entries of said first kind received continuously, a vector that runs from a position designated by an older one of the instruction entries of said first kind in the pair concerned to a position designated by a later one of the instruction entries of said first kind in the pair concerned makes an angle equal to or larger than a predetermined obtuse angle with a vector that runs in a direction in which only first coordinate values shift in said predetermined order in said two-dimensional region, deletes from said storage unit, second coordinate values stored in said storage unit in association with first coordinate values that are included in a range defined by a smallest value and a largest value among first coordinate values respectively designated by the instruction entries of said first kind received continuously.

\* \* \* \* \*